(12) United States Patent
Perkins et al.

(10) Patent No.: US 11,671,774 B2
(45) Date of Patent: *Jun. 6, 2023

(54) IMPRESSION PROCEDURE

(71) Applicant: Earlens Corporation, Menlo Park, CA (US)

(72) Inventors: Rodney Perkins, Woodside, AK (US); James Silver, Palo Alto, CA (US); Amanda French, San Francisco, CA (US); Spencer Croy, San Francisco, CA (US); Michelle M. Inserra, Mountain View, CA (US)

(73) Assignee: Earlens Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,544

(22) Filed: Sep. 1, 2021

(65) Prior Publication Data

US 2021/0400405 A1 Dec. 23, 2021

Related U.S. Application Data

(63) Continuation of application No. 16/405,716, filed on May 7, 2019, now Pat. No. 11,166,114, which is a continuation of application No. PCT/US2017/061388, filed on Nov. 13, 2017.

(60) Provisional application No. 62/564,574, filed on Sep. 28, 2017, provisional application No. 62/422,535, filed on Nov. 15, 2016.

(51) Int. Cl.
*H04R 25/00* (2006.01)

(52) U.S. Cl.
CPC ......... *H04R 25/652* (2013.01); *H04R 25/658* (2013.01); *H04R 2225/77* (2013.01)

(58) Field of Classification Search
CPC ............. H04R 2225/77; H04R 25/658; H04R 25/606; H04R 25/652; A61C 13/0004; A61C 9/004
USPC ........................................ 381/312, 322, 328
See application file for complete search history.

(56) References Cited

U.S. PATENT DOCUMENTS

| | | |
|---|---|---|
| 2,763,334 A | 9/1956 | Starkey |
| 3,209,082 A | 9/1965 | McCarrell et al. |
| 3,229,049 A | 1/1966 | Goldberg |
| 3,440,314 A | 4/1969 | Eldon |
| 3,449,768 A | 6/1969 | Doyle et al. |
| 3,526,949 A | 9/1970 | Frank |
| 3,549,818 A | 12/1970 | Justin |

(Continued)

FOREIGN PATENT DOCUMENTS

| | | |
|---|---|---|
| AU | 2004301961 A1 | 2/2005 |
| CA | 2242545 C | 9/2009 |

(Continued)

OTHER PUBLICATIONS

Notice of Allowance dated Jun. 3, 2021 for U.S. Appl. No. 16/405,716.

(Continued)

*Primary Examiner* — George C Monikang
(74) *Attorney, Agent, or Firm* — Polsinelli PC

(57) ABSTRACT

Improved methods are described for the creation of impressions for use in the manufacture of hearing aid components. In addition methods for manufacturing components of hearing aid systems using improved ear canal impressions are described.

12 Claims, 6 Drawing Sheets

(56) References Cited

U.S. PATENT DOCUMENTS

| | | |
|---|---|---|
| 3,585,416 A | 6/1971 | Mellen |
| 3,594,514 A | 7/1971 | Wingrove |
| 3,710,399 A | 1/1973 | Hurst |
| 3,712,962 A | 1/1973 | Epley |
| 3,764,748 A | 10/1973 | Branch et al. |
| 3,808,179 A | 4/1974 | Gaylord |
| 3,870,832 A | 3/1975 | Fredrickson |
| 3,882,285 A | 5/1975 | Nunley et al. |
| 3,965,430 A | 6/1976 | Brandt |
| 3,985,977 A | 10/1976 | Beaty et al. |
| 4,002,897 A | 1/1977 | Kleinman et al. |
| 4,031,318 A | 6/1977 | Pitre |
| 4,061,972 A | 12/1977 | Burgess |
| 4,075,042 A | 2/1978 | Das |
| 4,098,277 A | 7/1978 | Mendell |
| 4,109,116 A | 8/1978 | Victoreen |
| 4,120,570 A | 10/1978 | Gaylord |
| 4,207,441 A | 6/1980 | Ricard et al. |
| 4,248,899 A | 2/1981 | Lyon et al. |
| 4,252,440 A | 2/1981 | Fedors et al. |
| 4,281,419 A | 8/1981 | Treace |
| 4,303,772 A | 12/1981 | Novicky |
| 4,319,359 A | 3/1982 | Wolf |
| 4,334,315 A | 6/1982 | Ono et al. |
| 4,334,321 A | 6/1982 | Edelman |
| 4,338,929 A | 7/1982 | Lundin et al. |
| 4,339,954 A | 7/1982 | Anson et al. |
| 4,357,497 A | 11/1982 | Hochmair et al. |
| 4,375,016 A | 2/1983 | Harada |
| 4,380,689 A | 4/1983 | Giannetti |
| 4,428,377 A | 1/1984 | Zollner et al. |
| 4,524,294 A | 6/1985 | Brody |
| 4,540,761 A | 9/1985 | Kawamura et al. |
| 4,556,122 A | 12/1985 | Goode |
| 4,592,087 A | 5/1986 | Killion |
| 4,606,329 A | 8/1986 | Hough |
| 4,611,598 A | 9/1986 | Hortmann et al. |
| 4,628,907 A | 12/1986 | Epley |
| 4,641,377 A | 2/1987 | Rush et al. |
| 4,652,414 A | 3/1987 | Schlaegel |
| 4,654,554 A | 3/1987 | Kishi |
| 4,689,819 A | 8/1987 | Killion |
| 4,696,287 A | 9/1987 | Hortmann et al. |
| 4,729,366 A | 3/1988 | Schaefer |
| 4,741,339 A | 5/1988 | Harrison et al. |
| 4,742,499 A | 5/1988 | Butler |
| 4,756,312 A | 7/1988 | Epley |
| 4,759,070 A | 7/1988 | Voroba et al. |
| 4,766,607 A | 8/1988 | Feldman |
| 4,774,933 A | 10/1988 | Hough et al. |
| 4,776,322 A | 10/1988 | Hough et al. |
| 4,782,818 A | 11/1988 | Mori |
| 4,800,884 A | 1/1989 | Heide et al. |
| 4,800,982 A | 1/1989 | Carlson |
| 4,817,607 A | 4/1989 | Tatge |
| 4,840,178 A | 6/1989 | Heide et al. |
| 4,845,755 A | 7/1989 | Busch et al. |
| 4,865,035 A | 9/1989 | Mori |
| 4,870,688 A | 9/1989 | Voroba et al. |
| 4,918,745 A | 4/1990 | Hutchison |
| 4,932,405 A | 6/1990 | Peeters et al. |
| 4,936,305 A | 6/1990 | Ashtiani et al. |
| 4,944,301 A | 7/1990 | Widin et al. |
| 4,948,855 A | 8/1990 | Novicky |
| 4,957,478 A | 9/1990 | Maniglia et al. |
| 4,963,963 A | 10/1990 | Dorman |
| 4,982,434 A | 1/1991 | Lenhardt et al. |
| 4,999,819 A | 3/1991 | Newnham et al. |
| 5,003,608 A | 3/1991 | Carlson |
| 5,012,520 A | 4/1991 | Steeger |
| 5,015,224 A | 5/1991 | Maniglia |
| 5,015,225 A | 5/1991 | Hough et al. |
| 5,031,219 A | 7/1991 | Ward et al. |
| 5,061,282 A | 10/1991 | Jacobs |
| 5,066,091 A | 11/1991 | Stoy et al. |
| 5,068,902 A | 11/1991 | Ward |
| 5,094,108 A | 3/1992 | Kim et al. |
| 5,117,461 A | 5/1992 | Moseley |
| 5,142,186 A | 8/1992 | Cross et al. |
| 5,163,957 A | 11/1992 | Sade et al. |
| 5,167,235 A | 12/1992 | Seacord et al. |
| 5,201,007 A | 4/1993 | Ward et al. |
| 5,220,612 A | 6/1993 | Tibbetts et al. |
| 5,259,032 A | 11/1993 | Perkins et al. |
| 5,272,757 A | 12/1993 | Scofield et al. |
| 5,276,910 A | 1/1994 | Buchele |
| 5,277,694 A | 1/1994 | Leysieffer et al. |
| 5,282,858 A | 2/1994 | Bisch et al. |
| 5,296,797 A | 3/1994 | Bartlett |
| 5,298,692 A | 3/1994 | Ikeda et al. |
| 5,338,287 A | 8/1994 | Miller et al. |
| 5,360,388 A | 11/1994 | Spindel et al. |
| 5,378,933 A | 1/1995 | Pfannenmueller et al. |
| 5,402,496 A | 3/1995 | Soli et al. |
| 5,411,467 A | 5/1995 | Hortmann et al. |
| 5,424,698 A | 6/1995 | Dydyk et al. |
| 5,425,104 A | 6/1995 | Shennib |
| 5,440,082 A | 8/1995 | Claes |
| 5,440,237 A | 8/1995 | Brown et al. |
| 5,455,994 A | 10/1995 | Termeer et al. |
| 5,456,654 A | 10/1995 | Ball |
| 5,531,787 A | 7/1996 | Lesinski et al. |
| 5,531,954 A | 7/1996 | Heide et al. |
| 5,535,282 A | 7/1996 | Luca |
| 5,554,096 A | 9/1996 | Ball |
| 5,558,618 A | 9/1996 | Maniglia |
| 5,571,148 A | 11/1996 | Loeb et al. |
| 5,572,594 A | 11/1996 | Devoe et al. |
| 5,606,621 A | 2/1997 | Reiter et al. |
| 5,624,376 A | 4/1997 | Ball et al. |
| 5,654,530 A | 8/1997 | Sauer et al. |
| 5,692,059 A | 11/1997 | Kruger |
| 5,699,809 A | 12/1997 | Combs et al. |
| 5,701,348 A | 12/1997 | Shennib et al. |
| 5,707,338 A | 1/1998 | Adams et al. |
| 5,715,321 A | 2/1998 | Andrea et al. |
| 5,721,783 A | 2/1998 | Anderson |
| 5,722,411 A | 3/1998 | Suzuki et al. |
| 5,729,077 A | 3/1998 | Newnham et al. |
| 5,740,258 A | 4/1998 | Goodwin-Johansson |
| 5,742,692 A | 4/1998 | Garcia et al. |
| 5,749,912 A | 5/1998 | Zhang et al. |
| 5,762,583 A | 6/1998 | Adams et al. |
| 5,772,575 A | 6/1998 | Lesinski et al. |
| 5,774,259 A | 6/1998 | Saitoh et al. |
| 5,782,744 A | 7/1998 | Money |
| 5,788,711 A | 8/1998 | Lehner et al. |
| 5,795,287 A | 8/1998 | Ball et al. |
| 5,797,834 A | 8/1998 | Goode |
| 5,800,336 A | 9/1998 | Ball et al. |
| 5,804,109 A | 9/1998 | Perkins |
| 5,804,907 A | 9/1998 | Park et al. |
| 5,814,095 A | 9/1998 | Mueller et al. |
| 5,824,022 A | 10/1998 | Zilberman et al. |
| 5,825,122 A | 10/1998 | Givargizov et al. |
| 5,836,863 A | 11/1998 | Bushek et al. |
| 5,842,967 A | 12/1998 | Kroll |
| 5,851,199 A | 12/1998 | Peerless et al. |
| 5,857,958 A | 1/1999 | Ball et al. |
| 5,859,916 A | 1/1999 | Ball et al. |
| 5,868,682 A | 2/1999 | Combs et al. |
| 5,879,283 A | 3/1999 | Adams et al. |
| 5,888,187 A | 3/1999 | Jaeger et al. |
| 5,897,486 A | 4/1999 | Ball et al. |
| 5,899,847 A | 5/1999 | Adams et al. |
| 5,900,274 A | 5/1999 | Chatterjee et al. |
| 5,906,635 A | 5/1999 | Maniglia |
| 5,913,815 A | 6/1999 | Ball et al. |
| 5,922,017 A | 7/1999 | Bredberg et al. |
| 5,922,077 A | 7/1999 | Espy et al. |
| 5,935,170 A | 8/1999 | Haakansson et al. |
| 5,940,519 A | 8/1999 | Kuo |
| 5,949,895 A | 9/1999 | Ball et al. |
| 5,951,601 A | 9/1999 | Lesinski et al. |

(56) References Cited

U.S. PATENT DOCUMENTS

| | | |
|---|---|---|
| 5,984,859 A | 11/1999 | Lesinski |
| 5,987,146 A | 11/1999 | Pluvinage et al. |
| 6,001,129 A | 12/1999 | Bushek et al. |
| 6,005,955 A | 12/1999 | Kroll et al. |
| 6,011,984 A | 1/2000 | Van Antwerp et al. |
| 6,024,717 A | 2/2000 | Ball et al. |
| 6,038,480 A | 3/2000 | Hrdlicka et al. |
| 6,045,528 A | 4/2000 | Arenberg et al. |
| 6,050,933 A | 4/2000 | Bushek et al. |
| 6,067,474 A | 5/2000 | Schulman et al. |
| 6,068,589 A | 5/2000 | Neukermans |
| 6,068,590 A | 5/2000 | Brisken |
| 6,072,884 A | 6/2000 | Kates |
| 6,084,975 A | 7/2000 | Perkins |
| 6,093,144 A | 7/2000 | Jaeger et al. |
| 6,135,612 A | 10/2000 | Clore |
| 6,137,889 A | 10/2000 | Shennib et al. |
| 6,139,488 A | 10/2000 | Ball |
| 6,153,966 A | 11/2000 | Neukermans |
| 6,168,948 B1 | 1/2001 | Anderson et al. |
| 6,174,278 B1 | 1/2001 | Jaeger et al. |
| 6,175,637 B1 | 1/2001 | Fujihira et al. |
| 6,181,801 B1 | 1/2001 | Puthuff et al. |
| 6,190,305 B1 | 2/2001 | Ball et al. |
| 6,190,306 B1 | 2/2001 | Kennedy |
| 6,208,445 B1 | 3/2001 | Reime |
| 6,216,040 B1 | 4/2001 | Harrison |
| 6,217,508 B1 | 4/2001 | Ball et al. |
| 6,219,427 B1 | 4/2001 | Kates et al. |
| 6,222,302 B1 | 4/2001 | Imada et al. |
| 6,222,927 B1 | 4/2001 | Feng et al. |
| 6,240,192 B1 | 5/2001 | Brennan et al. |
| 6,241,767 B1 | 6/2001 | Stennert et al. |
| 6,259,951 B1 | 7/2001 | Kuzma et al. |
| 6,261,224 B1 | 7/2001 | Adams et al. |
| 6,264,603 B1 | 7/2001 | Kennedy |
| 6,277,148 B1 | 8/2001 | Dormer |
| 6,312,959 B1 | 11/2001 | Datskos |
| 6,339,648 B1 | 1/2002 | McIntosh et al. |
| 6,342,035 B1 | 1/2002 | Kroll et al. |
| 6,354,990 B1 | 3/2002 | Juneau et al. |
| 6,359,993 B2 | 3/2002 | Brimhall |
| 6,366,863 B1 | 4/2002 | Bye et al. |
| 6,374,143 B1 | 4/2002 | Berrang et al. |
| 6,385,363 B1 | 5/2002 | Rajic et al. |
| 6,387,039 B1 | 5/2002 | Moses |
| 6,390,971 B1 | 5/2002 | Adams et al. |
| 6,393,130 B1 | 5/2002 | Stonikas et al. |
| 6,422,991 B1 | 7/2002 | Jaeger |
| 6,432,248 B1 | 8/2002 | Popp et al. |
| 6,434,246 B1 | 8/2002 | Kates et al. |
| 6,434,247 B1 | 8/2002 | Kates et al. |
| 6,436,028 B1 | 8/2002 | Dormer |
| 6,438,244 B1 | 8/2002 | Juneau et al. |
| 6,445,799 B1 | 9/2002 | Taenzer et al. |
| 6,473,512 B1 | 10/2002 | Juneau et al. |
| 6,475,134 B1 | 11/2002 | Ball et al. |
| 6,491,622 B1 | 12/2002 | Kasic, II et al. |
| 6,491,644 B1 | 12/2002 | Vujanic et al. |
| 6,491,722 B1 | 12/2002 | Kroll et al. |
| 6,493,453 B1 | 12/2002 | Glendon |
| 6,493,454 B1 | 12/2002 | Loi et al. |
| 6,498,858 B2 | 12/2002 | Kates |
| 6,507,758 B1 | 1/2003 | Greenberg et al. |
| 6,519,376 B2 | 2/2003 | Biagi et al. |
| 6,523,985 B2 | 2/2003 | Hamanaka et al. |
| 6,536,530 B2 | 3/2003 | Schultz et al. |
| 6,537,200 B2 | 3/2003 | Leysieffer et al. |
| 6,547,715 B1 | 4/2003 | Mueller et al. |
| 6,549,633 B1 | 4/2003 | Westermann |
| 6,549,635 B1 | 4/2003 | Gebert |
| 6,554,761 B1 | 4/2003 | Puria et al. |
| 6,575,894 B2 | 6/2003 | Leysieffer et al. |
| 6,592,513 B1 | 7/2003 | Kroll et al. |
| 6,603,860 B1 | 8/2003 | Taenzer et al. |
| 6,620,110 B2 | 9/2003 | Schmid |
| 6,626,822 B1 | 9/2003 | Jaeger et al. |
| 6,629,922 B1 | 10/2003 | Puria et al. |
| 6,631,196 B1 | 10/2003 | Taenzer et al. |
| 6,643,378 B2 | 11/2003 | Schumaier |
| 6,663,575 B2 | 12/2003 | Leysieffer |
| 6,668,062 B1 | 12/2003 | Luo et al. |
| 6,676,592 B2 | 1/2004 | Ball et al. |
| 6,681,022 B1 | 1/2004 | Puthuff et al. |
| 6,695,943 B2 | 2/2004 | Juneau et al. |
| 6,697,674 B2 | 2/2004 | Leysieffer |
| 6,724,902 B1 | 4/2004 | Shennib et al. |
| 6,726,618 B2 | 4/2004 | Miller |
| 6,726,718 B1 | 4/2004 | Carlyle et al. |
| 6,727,789 B2 | 4/2004 | Tibbetts et al. |
| 6,728,024 B2 | 4/2004 | Ribak |
| 6,735,318 B2 | 5/2004 | Cho |
| 6,754,358 B1 | 6/2004 | Boesen et al. |
| 6,754,359 B1 | 6/2004 | Svean et al. |
| 6,754,537 B1 | 6/2004 | Harrison et al. |
| 6,785,394 B1 | 8/2004 | Olsen et al. |
| 6,792,114 B1 | 9/2004 | Kates et al. |
| 6,801,629 B2 | 10/2004 | Brimhall et al. |
| 6,829,363 B2 | 12/2004 | Sacha |
| 6,831,986 B2 | 12/2004 | Kates |
| 6,837,857 B2 | 1/2005 | Stirnemann |
| 6,842,647 B1 | 1/2005 | Griffith et al. |
| 6,888,949 B1 | 5/2005 | Vanden et al. |
| 6,900,926 B2 | 5/2005 | Ribak |
| 6,912,289 B2 | 6/2005 | Vonlanthen et al. |
| 6,920,340 B2 | 7/2005 | Laderman |
| 6,931,231 B1 | 8/2005 | Griffin |
| 6,940,988 B1 | 9/2005 | Shennib et al. |
| 6,940,989 B1 | 9/2005 | Shennib et al. |
| 6,942,989 B2 | 9/2005 | Felkner et al. |
| D512,979 S | 12/2005 | Corcoran et al. |
| 6,975,402 B2 | 12/2005 | Bisson et al. |
| 6,978,159 B2 | 12/2005 | Feng et al. |
| 7,020,297 B2 | 3/2006 | Fang et al. |
| 7,024,010 B2 | 4/2006 | Saunders et al. |
| 7,043,037 B2 | 5/2006 | Lichtblau et al. |
| 7,050,675 B2 | 5/2006 | Zhou et al. |
| 7,050,876 B1 | 5/2006 | Fu et al. |
| 7,057,256 B2 | 6/2006 | Mazur et al. |
| 7,058,182 B2 | 6/2006 | Kates |
| 7,058,188 B1 | 6/2006 | Allred |
| 7,072,475 B1 | 7/2006 | Denap et al. |
| 7,076,076 B2 | 7/2006 | Bauman |
| 7,095,981 B1 | 8/2006 | Voroba et al. |
| 7,167,572 B1 | 1/2007 | Harrison et al. |
| 7,174,026 B2 | 2/2007 | Niederdrank et al. |
| 7,179,238 B2 | 2/2007 | Hissong |
| 7,181,034 B2 | 2/2007 | Armstrong |
| 7,203,331 B2 | 4/2007 | Boesen |
| 7,239,069 B2 | 7/2007 | Cho |
| 7,245,732 B2 | 7/2007 | Jorgensen et al. |
| 7,255,457 B2 | 8/2007 | Ducharme et al. |
| 7,266,208 B2 | 9/2007 | Charvin et al. |
| 7,289,639 B2 | 10/2007 | Abel et al. |
| 7,313,245 B1 | 12/2007 | Shennib |
| 7,315,211 B1 | 1/2008 | Lee et al. |
| 7,322,930 B2 | 1/2008 | Jaeger et al. |
| 7,349,741 B2 | 3/2008 | Maltan et al. |
| 7,354,792 B2 | 4/2008 | Mazur et al. |
| 7,376,563 B2 | 5/2008 | Leysieffer et al. |
| 7,390,689 B2 | 6/2008 | Mazur et al. |
| 7,394,909 B1 | 7/2008 | Widmer et al. |
| 7,421,087 B2 | 9/2008 | Perkins et al. |
| 7,424,122 B2 | 9/2008 | Ryan |
| 7,444,877 B2 | 11/2008 | Li et al. |
| 7,547,275 B2 | 6/2009 | Cho et al. |
| 7,630,646 B2 | 12/2009 | Anderson et al. |
| 7,645,877 B2 | 1/2010 | Gmeiner et al. |
| 7,668,325 B2 | 2/2010 | Puria et al. |
| 7,747,295 B2 | 6/2010 | Choi |
| 7,778,434 B2 | 8/2010 | Juneau et al. |
| 7,809,150 B2 | 10/2010 | Natarajan et al. |
| 7,822,215 B2 | 10/2010 | Carazo et al. |
| 7,826,632 B2 | 11/2010 | Von Buol et al. |

(56) References Cited

U.S. PATENT DOCUMENTS

| | | |
|---|---|---|
| 7,853,033 B2 | 12/2010 | Maltan et al. |
| 7,867,160 B2 | 1/2011 | Pluvinage et al. |
| 7,883,535 B2 | 2/2011 | Cantin et al. |
| 7,885,359 B2 | 2/2011 | Meltzer |
| 7,955,249 B2 | 6/2011 | Perkins et al. |
| 7,983,435 B2 | 7/2011 | Moses |
| 8,090,134 B2 | 1/2012 | Takigawa et al. |
| 8,099,169 B1 | 1/2012 | Karunasiri |
| 8,116,494 B2 | 2/2012 | Rass |
| 8,128,551 B2 | 3/2012 | Jolly |
| 8,157,730 B2 | 4/2012 | LeBoeuf et al. |
| 8,197,461 B1 | 6/2012 | Arenberg et al. |
| 8,204,786 B2 | 6/2012 | LeBoeuf et al. |
| 8,233,651 B1 | 7/2012 | Haller |
| 8,251,903 B2 | 8/2012 | LeBoeuf et al. |
| 8,284,970 B2 | 10/2012 | Sacha |
| 8,295,505 B2 | 10/2012 | Weinans et al. |
| 8,295,523 B2 | 10/2012 | Fay et al. |
| 8,320,601 B2 | 11/2012 | Takigawa et al. |
| 8,320,982 B2 | 11/2012 | LeBoeuf et al. |
| 8,340,310 B2 | 12/2012 | Ambrose et al. |
| 8,340,335 B1 | 12/2012 | Shennib |
| 8,391,527 B2 | 3/2013 | Feucht et al. |
| 8,396,235 B2 | 3/2013 | Gebhardt et al. |
| 8,396,239 B2 | 3/2013 | Fay et al. |
| 8,401,212 B2 | 3/2013 | Puria et al. |
| 8,401,214 B2 | 3/2013 | Perkins et al. |
| 8,506,473 B2 | 8/2013 | Puria |
| 8,512,242 B2 | 8/2013 | LeBoeuf et al. |
| 8,526,651 B2 | 9/2013 | Lafort et al. |
| 8,526,652 B2 | 9/2013 | Ambrose et al. |
| 8,526,971 B2 | 9/2013 | Giniger et al. |
| 8,545,383 B2 | 10/2013 | Wenzel et al. |
| 8,600,089 B2 | 12/2013 | Wenzel et al. |
| 8,647,270 B2 | 2/2014 | LeBoeuf et al. |
| 8,652,040 B2 | 2/2014 | LeBoeuf et al. |
| 8,684,922 B2 | 4/2014 | Tran |
| 8,696,054 B2 | 4/2014 | Crum |
| 8,696,541 B2 | 4/2014 | Pluvinage et al. |
| 8,700,111 B2 | 4/2014 | LeBoeuf et al. |
| 8,702,607 B2 | 4/2014 | LeBoeuf et al. |
| 8,715,152 B2 | 5/2014 | Puria et al. |
| 8,715,153 B2 | 5/2014 | Puria et al. |
| 8,715,154 B2 | 5/2014 | Perkins et al. |
| 8,761,423 B2 | 6/2014 | Wagner et al. |
| 8,787,609 B2 | 7/2014 | Perkins et al. |
| 8,788,002 B2 | 7/2014 | LeBoeuf et al. |
| 8,817,998 B2 | 8/2014 | Inoue |
| 8,824,715 B2 | 9/2014 | Fay et al. |
| 8,837,758 B2 | 9/2014 | Knudsen |
| 8,845,705 B2 | 9/2014 | Perkins et al. |
| 8,855,323 B2 | 10/2014 | Kroman |
| 8,858,419 B2 | 10/2014 | Puria et al. |
| 8,885,860 B2 | 11/2014 | Djalilian et al. |
| 8,886,269 B2 | 11/2014 | LeBoeuf et al. |
| 8,888,701 B2 | 11/2014 | LeBoeuf et al. |
| 8,923,941 B2 | 12/2014 | LeBoeuf et al. |
| 8,929,965 B2 | 1/2015 | LeBoeuf et al. |
| 8,929,966 B2 | 1/2015 | LeBoeuf et al. |
| 8,934,952 B2 | 1/2015 | LeBoeuf et al. |
| 8,942,776 B2 | 1/2015 | LeBoeuf et al. |
| 8,961,415 B2 | 2/2015 | LeBoeuf et al. |
| 8,986,187 B2 | 3/2015 | Perkins et al. |
| 8,989,830 B2 | 3/2015 | LeBoeuf et al. |
| 9,044,180 B2 | 6/2015 | LeBoeuf et al. |
| 9,049,528 B2 | 6/2015 | Fay et al. |
| 9,055,379 B2 | 6/2015 | Puria et al. |
| 9,131,312 B2 | 9/2015 | LeBoeuf et al. |
| 9,154,891 B2 | 10/2015 | Puria et al. |
| 9,211,069 B2 | 12/2015 | Larsen et al. |
| 9,226,083 B2 | 12/2015 | Puria et al. |
| 9,277,335 B2 | 3/2016 | Perkins et al. |
| 9,289,135 B2 | 3/2016 | LeBoeuf et al. |
| 9,289,175 B2 | 3/2016 | LeBoeuf et al. |
| 9,301,696 B2 | 4/2016 | LeBoeuf et al. |
| 9,314,167 B2 | 4/2016 | LeBoeuf et al. |
| 9,392,377 B2 | 7/2016 | Olsen et al. |
| 9,427,191 B2 | 8/2016 | LeBoeuf |
| 9,497,556 B2 | 11/2016 | Kaltenbacher et al. |
| 9,521,962 B2 | 12/2016 | LeBoeuf |
| 9,524,092 B2 | 12/2016 | Ren et al. |
| 9,538,921 B2 | 1/2017 | LeBoeuf et al. |
| 9,544,700 B2 | 1/2017 | Puria et al. |
| 9,564,862 B2 | 2/2017 | Hoyerby |
| 9,591,409 B2 | 3/2017 | Puria et al. |
| 9,749,758 B2 | 8/2017 | Puria et al. |
| 9,750,462 B2 | 9/2017 | LeBoeuf et al. |
| 9,788,785 B2 | 10/2017 | LeBoeuf |
| 9,788,794 B2 | 10/2017 | LeBoeuf et al. |
| 9,794,653 B2 | 10/2017 | Aumer et al. |
| 9,794,688 B2 | 10/2017 | You |
| 9,801,552 B2 | 10/2017 | Romesburg |
| 9,808,204 B2 | 11/2017 | LeBoeuf et al. |
| 9,924,276 B2 | 3/2018 | Wenzel |
| 9,930,458 B2 | 3/2018 | Freed et al. |
| 9,949,035 B2 | 4/2018 | Rucker et al. |
| 9,949,039 B2 | 4/2018 | Perkins et al. |
| 9,949,045 B2 | 4/2018 | Kure et al. |
| 9,961,454 B2 | 5/2018 | Puria et al. |
| 9,964,672 B2 | 5/2018 | Phair et al. |
| 10,003,888 B2 | 6/2018 | Stephanou et al. |
| 10,034,103 B2 | 7/2018 | Puria et al. |
| 10,143,592 B2 | 12/2018 | Goldstein |
| 10,154,352 B2 | 12/2018 | Perkins et al. |
| 10,178,483 B2 | 1/2019 | Teran et al. |
| 10,206,045 B2 | 2/2019 | Kaltenbacher et al. |
| 10,237,663 B2 | 3/2019 | Puria et al. |
| 10,284,964 B2 | 5/2019 | Olsen et al. |
| 10,286,215 B2 | 5/2019 | Perkins et al. |
| 10,292,601 B2 | 5/2019 | Perkins et al. |
| 10,306,381 B2 | 5/2019 | Sandhu et al. |
| 10,492,010 B2 | 11/2019 | Rucker et al. |
| 10,511,913 B2 | 12/2019 | Puria et al. |
| 10,516,946 B2 | 12/2019 | Puria et al. |
| 10,516,949 B2 | 12/2019 | Puria et al. |
| 10,516,950 B2 | 12/2019 | Perkins et al. |
| 10,516,951 B2 | 12/2019 | Wenzel |
| 10,531,206 B2 | 1/2020 | Freed et al. |
| 10,555,100 B2 | 2/2020 | Perkins et al. |
| 10,609,492 B2 | 3/2020 | Olsen et al. |
| 10,743,110 B2 | 8/2020 | Puria et al. |
| 10,779,094 B2 | 9/2020 | Rucker et al. |
| 10,863,286 B2 | 12/2020 | Perkins et al. |
| 11,057,714 B2 | 7/2021 | Puria et al. |
| 11,058,305 B2 | 7/2021 | Perkins et al. |
| 11,070,927 B2 | 7/2021 | Rucker et al. |
| 11,102,594 B2 | 8/2021 | Shaquer et al. |
| 11,153,697 B2 | 10/2021 | Olsen et al. |
| 11,166,114 B2 | 11/2021 | Perkins et al. |
| 11,212,626 B2 | 12/2021 | Larkin et al. |
| 11,252,516 B2 | 2/2022 | Wenzel |
| 11,259,129 B2 | 2/2022 | Freed et al. |
| 11,310,605 B2 | 4/2022 | Puria et al. |
| 11,317,224 B2 | 4/2022 | Puria |
| 11,337,012 B2 | 5/2022 | Atamaniuk et al. |
| 11,350,226 B2 | 5/2022 | Sandhu et al. |
| 2001/0003788 A1 | 6/2001 | Ball et al. |
| 2001/0007050 A1 | 7/2001 | Adelman |
| 2001/0024507 A1 | 9/2001 | Boesen |
| 2001/0027342 A1 | 10/2001 | Dormer |
| 2001/0029313 A1 | 10/2001 | Kennedy |
| 2001/0053871 A1 | 12/2001 | Zilberman et al. |
| 2002/0025055 A1 | 2/2002 | Stonikas et al. |
| 2002/0035309 A1 | 3/2002 | Leysieffer |
| 2002/0048374 A1 | 4/2002 | Soli et al. |
| 2002/0085728 A1 | 7/2002 | Shennib et al. |
| 2002/0086715 A1 | 7/2002 | Sahagen |
| 2002/0172350 A1 | 11/2002 | Edwards et al. |
| 2002/0183587 A1 | 12/2002 | Dormer |
| 2003/0021903 A1 | 1/2003 | Shlenker et al. |
| 2003/0055311 A1 | 3/2003 | Neukermans et al. |
| 2003/0064746 A1 | 4/2003 | Rader et al. |
| 2003/0081803 A1 | 5/2003 | Petilli et al. |
| 2003/0097178 A1 | 5/2003 | Roberson et al. |

(56) References Cited

U.S. PATENT DOCUMENTS

| | | |
|---|---|---|
| 2003/0125602 A1 | 7/2003 | Sokolich et al. |
| 2003/0142841 A1 | 7/2003 | Wiegand |
| 2003/0208099 A1 | 11/2003 | Ball |
| 2003/0208888 A1 | 11/2003 | Fearing et al. |
| 2004/0093040 A1 | 5/2004 | Boylston et al. |
| 2004/0121291 A1 | 6/2004 | Knapp et al. |
| 2004/0158157 A1 | 8/2004 | Jensen et al. |
| 2004/0165742 A1 | 8/2004 | Shennib et al. |
| 2004/0166495 A1 | 8/2004 | Greinwald, Jr. et al. |
| 2004/0167377 A1 | 8/2004 | Schafer et al. |
| 2004/0190734 A1 | 9/2004 | Kates |
| 2004/0202339 A1 | 10/2004 | O'Brien, Jr. et al. |
| 2004/0202340 A1 | 10/2004 | Armstrong et al. |
| 2004/0208333 A1 | 10/2004 | Cheung et al. |
| 2004/0234089 A1 | 11/2004 | Rembrand et al. |
| 2004/0234092 A1 | 11/2004 | Wada et al. |
| 2004/0236416 A1 | 11/2004 | Falotico |
| 2004/0240691 A1 | 12/2004 | Grafenberg |
| 2005/0018859 A1 | 1/2005 | Buchholz |
| 2005/0020873 A1 | 1/2005 | Berrang et al. |
| 2005/0036639 A1 | 2/2005 | Bachler et al. |
| 2005/0038498 A1 | 2/2005 | Dubrow et al. |
| 2005/0088435 A1 | 4/2005 | Geng |
| 2005/0101830 A1 | 5/2005 | Easter et al. |
| 2005/0111683 A1 | 5/2005 | Chabries et al. |
| 2005/0117765 A1 | 6/2005 | Meyer et al. |
| 2005/0190939 A1 | 9/2005 | Fretz |
| 2005/0196005 A1 | 9/2005 | Shennib et al. |
| 2005/0222823 A1* | 10/2005 | Brumback ........... H04R 25/652 703/1 |
| 2005/0226446 A1 | 10/2005 | Luo et al. |
| 2005/0267549 A1 | 12/2005 | Della et al. |
| 2005/0271870 A1 | 12/2005 | Jackson |
| 2005/0288739 A1 | 12/2005 | Hassler, Jr. et al. |
| 2006/0058573 A1 | 3/2006 | Neisz et al. |
| 2006/0062420 A1 | 3/2006 | Araki |
| 2006/0074159 A1 | 4/2006 | Lu et al. |
| 2006/0075175 A1 | 4/2006 | Jensen et al. |
| 2006/0161227 A1 | 7/2006 | Walsh, Jr. et al. |
| 2006/0161255 A1 | 7/2006 | Zarowski et al. |
| 2006/0177079 A1 | 8/2006 | Baekgaard et al. |
| 2006/0177082 A1 | 8/2006 | Solomito et al. |
| 2006/0183965 A1 | 8/2006 | Kasic, II et al. |
| 2006/0231914 A1 | 10/2006 | Carey, III et al. |
| 2006/0233398 A1 | 10/2006 | Husung |
| 2006/0237126 A1 | 10/2006 | Guffrey et al. |
| 2006/0247735 A1 | 11/2006 | Honert et al. |
| 2006/0256989 A1 | 11/2006 | Olsen et al. |
| 2006/0278245 A1 | 12/2006 | Gan |
| 2007/0030990 A1 | 2/2007 | Fischer |
| 2007/0036377 A1 | 2/2007 | Stirnemann |
| 2007/0076913 A1 | 4/2007 | Schanz |
| 2007/0083078 A1 | 4/2007 | Easter et al. |
| 2007/0127748 A1 | 6/2007 | Carlile et al. |
| 2007/0127752 A1 | 6/2007 | Armstrong |
| 2007/0127766 A1 | 6/2007 | Combest |
| 2007/0135870 A1 | 6/2007 | Shanks et al. |
| 2007/0161848 A1 | 7/2007 | Dalton et al. |
| 2007/0191673 A1 | 8/2007 | Ball et al. |
| 2007/0201713 A1 | 8/2007 | Fang et al. |
| 2007/0206825 A1 | 9/2007 | Thomasson |
| 2007/0223755 A1 | 9/2007 | Salvetti et al. |
| 2007/0225776 A1 | 9/2007 | Fritsch et al. |
| 2007/0236704 A1 | 10/2007 | Carr et al. |
| 2007/0250119 A1 | 10/2007 | Tyler et al. |
| 2007/0251082 A1 | 11/2007 | Milojevic et al. |
| 2007/0258507 A1 | 11/2007 | Lee et al. |
| 2007/0286429 A1 | 12/2007 | Grafenberg et al. |
| 2008/0021518 A1 | 1/2008 | Hochmair et al. |
| 2008/0051623 A1 | 2/2008 | Schneider et al. |
| 2008/0054509 A1 | 3/2008 | Berman et al. |
| 2008/0063228 A1 | 3/2008 | Mejia et al. |
| 2008/0063231 A1 | 3/2008 | Juneau et al. |
| 2008/0077198 A1 | 3/2008 | Webb et al. |
| 2008/0089292 A1 | 4/2008 | Kitazoe et al. |
| 2008/0107292 A1 | 5/2008 | Kornagel |
| 2008/0123866 A1 | 5/2008 | Rule et al. |
| 2008/0130927 A1 | 6/2008 | Theverapperuma et al. |
| 2008/0188707 A1 | 8/2008 | Bernard et al. |
| 2008/0298600 A1 | 12/2008 | Poe et al. |
| 2008/0300703 A1 | 12/2008 | Widmer et al. |
| 2009/0016553 A1 | 1/2009 | Ho et al. |
| 2009/0023976 A1 | 1/2009 | Cho et al. |
| 2009/0043149 A1 | 2/2009 | Abel et al. |
| 2009/0076581 A1 | 3/2009 | Gibson |
| 2009/0131742 A1 | 5/2009 | Cho et al. |
| 2009/0141919 A1 | 6/2009 | Spitaels et al. |
| 2009/0149697 A1 | 6/2009 | Steinhardt et al. |
| 2009/0157143 A1 | 6/2009 | Edler et al. |
| 2009/0175474 A1 | 7/2009 | Salvetti et al. |
| 2009/0246627 A1 | 10/2009 | Park |
| 2009/0253951 A1 | 10/2009 | Ball et al. |
| 2009/0262966 A1 | 10/2009 | Vestergaard et al. |
| 2009/0281367 A1 | 11/2009 | Cho et al. |
| 2009/0310805 A1 | 12/2009 | Petroff |
| 2009/0316922 A1 | 12/2009 | Merks et al. |
| 2010/0036488 A1 | 2/2010 | De Juan, Jr. et al. |
| 2010/0085176 A1 | 4/2010 | Flick |
| 2010/0103404 A1 | 4/2010 | Remke et al. |
| 2010/0114190 A1 | 5/2010 | Bendett et al. |
| 2010/0145135 A1 | 6/2010 | Ball et al. |
| 2010/0171369 A1 | 7/2010 | Baarman et al. |
| 2010/0172507 A1 | 7/2010 | Merks |
| 2010/0177918 A1 | 7/2010 | Keady et al. |
| 2010/0222639 A1 | 9/2010 | Purcell et al. |
| 2010/0260364 A1 | 10/2010 | Merks |
| 2010/0272299 A1 | 10/2010 | Van Schuylenbergh et al. |
| 2010/0290653 A1 | 11/2010 | Wiggins et al. |
| 2010/0322452 A1 | 12/2010 | Ladabaum et al. |
| 2011/0062793 A1 | 3/2011 | Azancot et al. |
| 2011/0069852 A1 | 3/2011 | Arndt et al. |
| 2011/0084654 A1 | 4/2011 | Julstrom et al. |
| 2011/0112462 A1 | 5/2011 | Parker et al. |
| 2011/0116666 A1 | 5/2011 | Dittberner et al. |
| 2011/0125222 A1 | 5/2011 | Perkins et al. |
| 2011/0130622 A1 | 6/2011 | Ilberg et al. |
| 2011/0144414 A1 | 6/2011 | Spearman et al. |
| 2011/0164771 A1 | 7/2011 | Jensen et al. |
| 2011/0196460 A1 | 8/2011 | Weiss |
| 2011/0221391 A1 | 9/2011 | Won et al. |
| 2011/0249845 A1 | 10/2011 | Kates |
| 2011/0249847 A1 | 10/2011 | Salvetti et al. |
| 2011/0257290 A1* | 10/2011 | Zeller ..................... A61K 6/90 523/109 |
| 2011/0258839 A1 | 10/2011 | Probst |
| 2011/0271965 A1 | 11/2011 | Parkins et al. |
| 2012/0008807 A1 | 1/2012 | Gran |
| 2012/0038881 A1 | 2/2012 | Amirparviz et al. |
| 2012/0039493 A1 | 2/2012 | Rucker et al. |
| 2012/0092461 A1* | 4/2012 | Fisker ................. H04N 13/296 348/46 |
| 2012/0114157 A1 | 5/2012 | Arndt et al. |
| 2012/0140967 A1 | 6/2012 | Aubert et al. |
| 2012/0217087 A1 | 8/2012 | Ambrose et al. |
| 2012/0236524 A1 | 9/2012 | Pugh et al. |
| 2012/0263339 A1 | 10/2012 | Funahashi |
| 2013/0004004 A1 | 1/2013 | Zhao et al. |
| 2013/0034258 A1 | 2/2013 | Lin |
| 2013/0083938 A1 | 4/2013 | Bakalos et al. |
| 2013/0089227 A1 | 4/2013 | Kates |
| 2013/0195300 A1 | 8/2013 | Larsen et al. |
| 2013/0230204 A1 | 9/2013 | Monahan et al. |
| 2013/0303835 A1 | 11/2013 | Koskowich |
| 2013/0308782 A1 | 11/2013 | Dittberner et al. |
| 2013/0308807 A1 | 11/2013 | Burns |
| 2013/0343584 A1 | 12/2013 | Bennett et al. |
| 2013/0343585 A1 | 12/2013 | Bennett et al. |
| 2013/0343587 A1 | 12/2013 | Naylor et al. |
| 2014/0084698 A1 | 3/2014 | Asanuma et al. |
| 2014/0107423 A1 | 4/2014 | Yaacobi |
| 2014/0153761 A1 | 6/2014 | Shennib et al. |
| 2014/0169603 A1 | 6/2014 | Sacha et al. |
| 2014/0177863 A1 | 6/2014 | Parkins |
| 2014/0194891 A1 | 7/2014 | Shahoian |

(56) References Cited

U.S. PATENT DOCUMENTS

| | | |
|---|---|---|
| 2014/0254856 A1 | 9/2014 | Blick et al. |
| 2014/0286514 A1 | 9/2014 | Pluvinage et al. |
| 2014/0288356 A1 | 9/2014 | Van Vlem |
| 2014/0288358 A1 | 9/2014 | Puria et al. |
| 2014/0296620 A1 | 10/2014 | Puria et al. |
| 2014/0321657 A1 | 10/2014 | Stirnemann |
| 2014/0379874 A1 | 12/2014 | Starr et al. |
| 2015/0021568 A1 | 1/2015 | Gong et al. |
| 2015/0049889 A1 | 2/2015 | Bern |
| 2015/0117689 A1 | 4/2015 | Bergs et al. |
| 2015/0124985 A1 | 5/2015 | Kim et al. |
| 2015/0201269 A1 | 7/2015 | Dahl |
| 2015/0222978 A1 | 8/2015 | Murozaki |
| 2015/0245131 A1 | 8/2015 | Facteau et al. |
| 2015/0358743 A1 | 12/2015 | Killion |
| 2016/0008176 A1 | 1/2016 | Goldstein |
| 2016/0064814 A1 | 3/2016 | Jang et al. |
| 2016/0087687 A1 | 3/2016 | Kesler et al. |
| 2016/0094043 A1 | 3/2016 | Hao et al. |
| 2016/0277854 A1 | 9/2016 | Puria et al. |
| 2016/0309265 A1 | 10/2016 | Pluvinage et al. |
| 2016/0309266 A1 | 10/2016 | Olsen et al. |
| 2016/0330555 A1 | 11/2016 | Vonlanthen et al. |
| 2017/0040012 A1 | 2/2017 | Goldstein |
| 2017/0095202 A1 | 4/2017 | Facteau et al. |
| 2017/0180888 A1 | 6/2017 | Andersson et al. |
| 2017/0195806 A1 | 7/2017 | Atamaniuk et al. |
| 2017/0257710 A1 | 9/2017 | Parker |
| 2018/0077503 A1 | 3/2018 | Shaquer et al. |
| 2018/0077504 A1 | 3/2018 | Shaquer et al. |
| 2018/0213331 A1 | 7/2018 | Rucker et al. |
| 2018/0262846 A1 | 9/2018 | Perkins et al. |
| 2018/0317026 A1 | 11/2018 | Puria |
| 2018/0376255 A1 | 12/2018 | Parker |
| 2019/0166438 A1 | 5/2019 | Perkins et al. |
| 2019/0253811 A1 | 8/2019 | Unno et al. |
| 2019/0253815 A1 | 8/2019 | Atamaniuk et al. |
| 2020/0037082 A1 | 1/2020 | Perkins et al. |
| 2020/0128338 A1 | 4/2020 | Shaquer et al. |
| 2020/0186942 A1 | 6/2020 | Flaherty et al. |
| 2020/0336843 A1 | 10/2020 | Lee et al. |
| 2020/0396551 A1 | 12/2020 | Dy et al. |
| 2021/0029451 A1 | 1/2021 | Fitz et al. |
| 2021/0186343 A1 | 6/2021 | Perkins et al. |
| 2021/0266686 A1 | 8/2021 | Puria et al. |
| 2021/0274293 A1 | 9/2021 | Perkins et al. |
| 2021/0306777 A1 | 9/2021 | Rucker et al. |
| 2021/0314712 A1 | 10/2021 | Shaquer et al. |
| 2021/0392449 A1 | 12/2021 | Flaherty et al. |
| 2022/0007114 A1 | 1/2022 | Perkins et al. |
| 2022/0007115 A1 | 1/2022 | Perkins et al. |
| 2022/0007118 A1 | 1/2022 | Rucker et al. |
| 2022/0007120 A1 | 1/2022 | Olsen et al. |
| 2022/0046366 A1 | 2/2022 | Larkin et al. |
| 2022/0086572 A1 | 3/2022 | Flaherty et al. |
| 2022/0150650 A1 | 5/2022 | Rucker |

FOREIGN PATENT DOCUMENTS

| | | |
|---|---|---|
| CN | 1176731 A | 3/1998 |
| CN | 101459868 A | 6/2009 |
| CN | 101489171 A | 7/2009 |
| CN | 102301747 A | 12/2011 |
| CN | 105491496 A | 4/2016 |
| DE | 2044870 A1 | 3/1972 |
| DE | 3243850 A1 | 5/1984 |
| DE | 3508830 A1 | 9/1986 |
| DE | 102013114771 A1 | 6/2015 |
| EP | 0092822 A2 | 11/1983 |
| EP | 0242038 A2 | 10/1987 |
| EP | 0291325 A2 | 11/1988 |
| EP | 0296092 A2 | 12/1988 |
| EP | 0242038 A3 | 5/1989 |
| EP | 0296092 A3 | 8/1989 |
| EP | 0352954 A2 | 1/1990 |
| EP | 0291325 A3 | 6/1990 |
| EP | 0352954 A3 | 8/1991 |
| EP | 1035753 A1 | 9/2000 |
| EP | 1435757 A1 | 7/2004 |
| EP | 1845919 A1 | 10/2007 |
| EP | 1955407 A1 | 8/2008 |
| EP | 1845919 B1 | 9/2010 |
| EP | 2272520 A1 | 1/2011 |
| EP | 2301262 A1 | 3/2011 |
| EP | 2752030 A1 | 7/2014 |
| EP | 3101519 A1 | 12/2016 |
| EP | 2425502 B1 | 1/2017 |
| EP | 2907294 B1 | 5/2017 |
| EP | 3183814 A1 | 6/2017 |
| EP | 3094067 B1 | 10/2017 |
| EP | 3006079 B1 | 3/2019 |
| FR | 2455820 A1 | 11/1980 |
| GB | 2085694 A | 4/1982 |
| JP | S60154800 A | 8/1985 |
| JP | S621726 B2 | 1/1987 |
| JP | S6443252 A | 2/1989 |
| JP | H09327098 A | 12/1997 |
| JP | 2000504913 A | 4/2000 |
| JP | 2004187953 A | 7/2004 |
| JP | 2004193908 A | 7/2004 |
| JP | 2005516505 A | 6/2005 |
| JP | 2006060833 A | 3/2006 |
| KR | 100624445 B1 | 9/2006 |
| WO | WO-9209181 A1 | 5/1992 |
| WO | WO-9501678 A1 | 1/1995 |
| WO | WO-9621334 A1 | 7/1996 |
| WO | WO-9736457 A1 | 10/1997 |
| WO | WO-9745074 A1 | 12/1997 |
| WO | WO-9806236 A1 | 2/1998 |
| WO | WO-9903146 A1 | 1/1999 |
| WO | WO-9915111 A1 | 4/1999 |
| WO | WO-0022875 A2 | 4/2000 |
| WO | WO-0022875 A3 | 7/2000 |
| WO | WO-0150815 A1 | 7/2001 |
| WO | WO-0158206 A2 | 8/2001 |
| WO | WO-0176059 A2 | 10/2001 |
| WO | WO-0158206 A3 | 2/2002 |
| WO | WO-0239874 A2 | 5/2002 |
| WO | WO-0239874 A3 | 2/2003 |
| WO | WO-03030772 A2 | 4/2003 |
| WO | WO-03063542 A2 | 7/2003 |
| WO | WO-03063542 A3 | 1/2004 |
| WO | WO-2004010733 A1 | 1/2004 |
| WO | WO-2005015952 A1 | 2/2005 |
| WO | WO-2005107320 A1 | 11/2005 |
| WO | WO-2006014915 A2 | 2/2006 |
| WO | WO-2006037156 A1 | 4/2006 |
| WO | WO-2006039146 A2 | 4/2006 |
| WO | WO-2006042298 A2 | 4/2006 |
| WO | WO-2006071210 A1 | 7/2006 |
| WO | WO-2006075169 A1 | 7/2006 |
| WO | WO-2006075175 A1 | 7/2006 |
| WO | WO-2006118819 A2 | 11/2006 |
| WO | WO-2006042298 A3 | 12/2006 |
| WO | WO-2007023164 A1 | 3/2007 |
| WO | WO-2009046329 A1 | 4/2009 |
| WO | WO-2009047370 A2 | 4/2009 |
| WO | WO-2009049320 A1 | 4/2009 |
| WO | WO-2009056167 A1 | 5/2009 |
| WO | WO-2009062142 A1 | 5/2009 |
| WO | WO-2009047370 A3 | 7/2009 |
| WO | WO-2009125903 A1 | 10/2009 |
| WO | WO-2009145842 A2 | 12/2009 |
| WO | WO-2009146151 A2 | 12/2009 |
| WO | WO-2009155358 A1 | 12/2009 |
| WO | WO-2009155361 A1 | 12/2009 |
| WO | WO-2009155385 A1 | 12/2009 |
| WO | WO-2010033932 A1 | 3/2010 |
| WO | WO-2010033933 A1 | 3/2010 |
| WO | WO-2010077781 A2 | 7/2010 |
| WO | WO-2010147935 A1 | 12/2010 |
| WO | WO-2010148345 A2 | 12/2010 |
| WO | WO-2011005500 A2 | 1/2011 |
| WO | WO-2012088187 A2 | 6/2012 |

(56) References Cited

FOREIGN PATENT DOCUMENTS

| WO | WO-2012149970 A1 | 11/2012 |
|---|---|---|
| WO | WO-2013016336 A2 | 1/2013 |
| WO | WO-2016011044 A1 | 1/2016 |
| WO | WO-2016045709 A1 | 3/2016 |
| WO | WO-2016146487 A1 | 9/2016 |
| WO | WO-2017045700 A1 | 3/2017 |
| WO | WO-2017059218 A1 | 4/2017 |
| WO | WO-2017059240 A1 | 4/2017 |
| WO | WO-2017116791 A1 | 7/2017 |
| WO | WO-2017116865 A1 | 7/2017 |
| WO | WO-2018048794 A1 | 3/2018 |
| WO | WO-2018081121 A1 | 5/2018 |
| WO | WO-2018093733 A1 | 5/2018 |
| WO | WO-2019055308 A1 | 3/2019 |
| WO | WO-2019173470 A1 | 9/2019 |
| WO | WO-2019199680 A1 | 10/2019 |
| WO | WO-2019199683 A1 | 10/2019 |
| WO | WO-2020176086 A1 | 9/2020 |
| WO | WO-2021003087 A1 | 1/2021 |

OTHER PUBLICATIONS

Office action dated Nov. 27, 2020 for U.S. Appl. No. 16/405,716.
Asbeck, et al. Scaling Hard Vertical Surfaces with Compliant Microspine Arrays, The International Journal of Robotics Research 2006; 25; 1165-79.
Atasoy [Paper] Opto-acoustic Imaging, for BYM504E Biomedical Imaging Systems class at ITU, downloaded from the Internet www2.itu.edu.td—cilesiz/courses/BYM504-2005-OA504041413. pdf, 14 pages.
Athanassiou, et al. Laser controlled photomechanical actuation of photochromic polymers Microsystems. Rev. Adv. Mater. Sci. 2003; 5:245-251.
Autumn, et al. Dynamics of geckos running vertically, The Journal of Experimental Biology 209, 260-272, (2006).
Autumn, et al., Evidence for van der Waals adhesion in gecko setae, www.pnas.orgycgiydoiy10.1073ypnas.192252799 (2002).
Ayatollahi, et al. Design and Modeling of Micromachined Condenser MEMS Loudspeaker using Permanent Magnet Neodymium-Iron-Boron (Nd—Fe—B). IEEE International Conference on Semiconductor Electronics, 2006. ICSE '06, Oct. 29 2006-Dec. 1, 2006; 160-166.
Baer, et al. Effects of Low Pass Filtering on the Intelligibility of Speech in Noise for People With and Without Dead Regions at High Frequencies. J. Acost. Soc. Am 112 (3), pt. 1, (Sep. 2002), pp. 1133-1144.
Best, et al. The influence of high frequencies on speech localization. Abstract 981 (Feb. 24, 2003) from www.aro.org/abstracts/abstracts. html.
Birch, et al. Microengineered systems for the hearing impaired. IEE Colloquium on Medical Applications of Microengineering, Jan. 31, 1996; pp. 2/1-2/5.
Boedts. Tympanic epithelial migration, Clinical Otolaryngology 1978, 3, 249-253.
Burkhard, et al. Anthropometric Manikin for Acoustic Research. J. Acoust. Soc. Am., vol. 58, No. 1, (Jul. 1975), pp. 214-222.
Camacho-Lopez, et al. Fast Liquid Crystal Elastomer Swims Into the Dark, Electronic Liquid Crystal Communications. Nov. 26, 2003; 9 pages total.
Carlile, et al. Frequency bandwidth and multi-talker environments. Audio Engineering Society Convention 120. Audio Engineering Society, May 20-23, 2006. Paris, France. 118: 8 pages.
Carlile, et al. Spatialisation of talkers and the segregation of concurrent speech. Abstract 1264 (Feb. 24, 2004) from www.aro.org/abstracts/abstracts.html.
Cheng, et al. A Silicon Microspeaker for Hearing Instruments. Journal of Micromechanics and Microengineering 2004; 14(7):859-866.
Co-pending U.S. Appl. No. 17/356,217, inventors Imatani; Kyle et al., filed Jun. 23, 2021.

Dictionary.corn's (via American Heritage Medical Dictionary) online dictionary definition of 'percutaneous'. Accessed on Jun. 3, 2013. 2 pages.
Copy of Merriam-Webster's online dictionary definition of 'percutaneous'. Accessed on Jun. 3, 2013. 3 pages.
Datskos, et al. Photoinduced and thermal stress in silicon microcantilevers. Applied Physics Letters. Oct. 19, 1998; 73(16):2319-2321.
Decraemer, et al. A method for determining three-dimensional vibration in the ear. Hearing Res., 77:19-37 (1994).
Dundas et al. The Earlens Light-Driven Hearing Aid: Top 10 questions and answers. Hearing Review. 2018;25(2):36-39.
Ear. Downloaded from the Internet. Accessed Jun. 17, 2008. 4 pages. URL: http://wwwmgs.bionet.nsc.ru/mgs/gnw/trrd/thesaurus/Se/ear.html.
Edinger, J.R. High-Quality Audio Amplifier With Automatic Bias Control. Audio Engineering; Jun. 1947; pp. 7-9.
Fay. Cat eardrum mechanics. Ph.D. thesis. Dissertation submitted to Department of Aeronautics and Astronautics. Stanford University. May 2001; 210 pages total.
Fay, et al. Cat eardrum response mechanics. Mechanics and Computation Division. Department of Mechanical Engineering. Stanford University. 2002; 10 pages total.
Fay, et al. Preliminary evaluation of a light-based contact hearing device for the hearing impaired. Otol Neurotol. Jul. 2013;34(5):912-21. doi: 10.1097/MAO.0b013e31827de4b1.
Fay, et al. The discordant eardrum, PNAS, Dec. 26, 2006, vol. 103, No. 52, p. 19743-19748.
Fletcher. Effects of Distortion on the Individual Speech Sounds. Chapter 18, ASA Edition of Speech and Hearing in Communication, Acoust Soc.of Am. (republished in 1995) pp. 415-423.
Folkeard, et al. Detection, Speech Recognition, Loudness, and Preference Outcomes With a Direct Drive Hearing Aid: Effects of Bandwidth. Trends Hear. Jan.-Dec. 2021; 25: 1-17. doi: 10.1177/2331216521999139.
Freyman, et al. Spatial Release from Informational Masking in Speech Recognition. J. Acost. Soc. Am., vol. 109, No. 5, pt. 1, (May 2001); 2112-2122.
Freyman, et al. The Role of Perceived Spatial Separation in the Unmasking of Speech. J. Acoust. Soc. Am., vol. 106, No. 6, (Dec. 1999); 3578-3588.
Fritsch, et al. EarLens transducer behavior in high-field strength MRI scanners. Otolaryngol Head Neck Surg. Mar. 2009;140(3):426-8. doi: 10.1016/j.otohns.2008.10.016.
Galbraith et al. A wide-band efficient inductive transdermal power and data link with coupling insensitive gain IEEE Trans Biomed Eng. Apr. 1987;34(4):265-75.
Gantz, et al. Broad Spectrum Amplification with a Light Driven Hearing System. Combined Otolaryngology Spring Meetings, 2016 (Chicago).
Gantz, et al. Light Driven Hearing System: A Multi-Center Clinical Study. Association for Research in Otolaryngology Annual Meeting, 2016 (San Diego).
Gantz, et al. Light-Driven Contact Hearing Aid for Broad Spectrum Amplification: Safety and Effectiveness Pivotal Study. Otology & Neurotology Journal, 2016 (in review).
Gantz, et al. Light-Driven Contact Hearing Aid for Broad-Spectrum Amplification: Safety and Effectiveness Pivotal Study. Otology & Neurotology. Copyright 2016. 7 pages.
Ge, et al., Carbon nanotube-based synthetic gecko tapes, p. 10792-10795, PNAS, Jun. 26, 2007, vol. 104, No. 26.
Gennum. GA3280 Preliminary Data Sheet: Voyageur TD Open Platform DSP System for Ultra Low Power Audio Processing. Oct. 2006; 17 pages. Downloaded from the Internet: www.sounddesigntechnologies.com/products/pdf/37601DOC.pdf.
Gobin, et al. Comments on the physical basis of the active materials concept. Proc. SPIE 2003; 4512:84-92.
Gorb, et al. Structural Design and Biomechanics of Friction-Based Releasable Attachment Devices in Insects. Integr Comp Biol. Dec. 2002. 42(6):1127-1139. doi: 10.1093/icb/42.6.1127.
Hakansson, et al. Percutaneous vs. transcutaneous transducers for hearing by direct bone conduction (Abstract). Otolaryngol Head Neck Surg. Apr. 1990;102(4):339-44.

(56) References Cited

OTHER PUBLICATIONS

Hato, et al. Three-dimensional stapes footplate motion in human temporal bones. Audiol. Neurootol., 8:140-152 (Jan. 30, 2003).
Hofman, et al. Relearning Sound Localization With New Ears. Nature Neuroscience, vol. 1, No. 5, (Sep. 1998); 417-421.
International Search Report and Written Opinion dated Jan. 19, 2018 for International PCT Patent Application No. PCT/US2017/061388.
Izzo, et al. Laser Stimulation of Auditory Neurons: Effect of Shorter Pulse Duration and Penetration Depth. Biophys J. Apr. 15, 2008;94(8):3159-3166.
Izzo, et al. Laser Stimulation of the Auditory Nerve. Lasers Surg Med. Sep. 2006;38(8):745-753.
Izzo, et al. Selectivity of Neural Stimulation in the Auditory System: A Comparison of Optic and Electric Stimuli. J Biomed Opt. Mar.-Apr. 2007;12(2):021008.
Jackson, et al. Multiphoton and Transmission Electron Microscopy of Collagen in Ex Vivo Tympanic Membranes. Ninth Annual Symposium on Biomedical Computation at Stanford (BCATS). BCATS 2008 Abstract Book. Poster 18:56. Oct. 2008. URL: www.stanford.edu/~puria1/BCATS08.html.
Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.
Jin, et al. Speech Localization. J. Audio Eng. Soc. convention paper, presented at the AES 112th Convention, Munich, Germany, May 10-13, 2002, 13 pages total.
Khaleghi, et al. Attenuating the ear canal feedback pressure of a laser-driven hearing aid. J Acoust Soc Am. Mar. 2017;141(3):1683.
Khaleghi, et al. Attenuating the feedback pressure of a light-activated hearing device to allows microphone placement at the ear canal entrance. IHCON 2016, International Hearing Aid Research Conference, Tahoe City, CA, Aug. 2016.
Khaleghi, et al. Characterization of Ear-Canal Feedback Pressure due to Umbo-Drive Forces: Finite-Element vs. Circuit Models. ARO Midwinter Meeting 2016, (San Diego).
Khaleghi, et al. Mechano-Electro-Magnetic Finite Element Model of a Balanced Armature Transducer for a Contact Hearing Aid. Proc. MoH 2017, Mechanics of Hearing workshop, Brock University, Jun. 2017.
Khaleghi, et al. Multiphysics Finite Element Model of a Balanced Armature Transducer used in a Contact Hearing Device. ARO 2017, 40th ARO MidWinter Meeting, Baltimore, MD, Feb. 2017.
Kiessling, et al. Occlusion Effect of Earmolds with Different Venting Systems. J Am Acad Audiol. Apr. 2005;16(4):237-49.
Killion, et al. The case of the missing dots: AI and SNR loss. The Hearing Journal, 1998. 51(5), 32-47.
Killion. Myths About Hearing in Noise and Directional Microphones. The Hearing Review. Feb. 2004; 11(2):14, 16, 18, 19, 72 & 73.
Killion. SNR loss: I can hear what people say but I can't understand them. The Hearing Review, 1997; 4(12):8-14.
Knight, D. Diode detectors for RF measurement. Paper. Jan. 1, 2016. [Retrieved from 1-16 online] (retrieved Feb. 11, 2020) abstract, p. 1; section 1, p. 6; section 1.3, p. 9; section 3 voltage-double rectifier, p. 21; section 5, p. 27. URL: g3ynh.info/circuits/Diode_det.pdf.
Lee, et al. A Novel Opto-Electromagnetic Actuator Coupled to the tympanic Membrane. J Biomech. Dec. 5, 2008;41(16):3515-8. Epub Nov. 7, 2008.
Lee, et al. The optimal magnetic force for a novel actuator coupled to the tympanic membrane: a finite element analysis. Biomedical engineering: applications, basis and communications. 2007; 19(3):171-177.
Levy, et al. Characterization of the available feedback gain margin at two device microphone locations, in the fossa triangularis and Behind the Ear, for the light-based contact hearing device. Acoustical Society of America (ASA) meeting, 2013 (San Francisco).

Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.
Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.
Lezal. Chalcogenide glasses—survey and progress. Journal of Optoelectronics and Advanced Materials. Mar. 2003; 5(1):23-34.
Mah. Fundamentals of photovoltaic materials. National Solar Power Research Institute. Dec. 21, 1998, 3-9.
Makino, et al. Epithelial migration in the healing process of tympanic membrane perforations. Eur Arch Otorhinolaryngol. 1990; 247: 352-355.
Makino, et al., Epithelial migration on the tympanic membrane and external canal, Arch Otorhinolaryngol (1986) 243:39-42.
Markoff. Intuition + Money: An Aha Moment. New York Times Oct. 11, 2008, p. BU4, 3 pages total.
Martin, et al. Utility of Monaural Spectral Cues is Enhanced in the Presence of Cues to Sound-Source Lateral Angle. JARO. 2004; 5:80-89.
McElveen et al. Overcoming High-Frequency Limitations of Air Conduction Hearing Devices Using a Light-Driven Contact Hearing Aid. Poster presentation at the Triological Society, 120th Annual Meeting at COSM, Apr. 28, 2017; San Diego, CA.
Michaels, et al., Auditory epithelial migration on the human tympanic membrane: II. The existence of two discrete migratory pathways and their embryologic correlates. Am J Anat. Nov. 1990. 189(3):189-200. DOI: 10.1002/aja.1001890302.
Moore, et al. Perceived naturalness of spectrally distorted speech and music. J Acoust Soc Am. Jul. 2003;114(1):408-19.
Moore, et al. Spectro-temporal characteristics of speech at high frequencies, and the potential for restoration of audibility to people with mild-to-moderate hearing loss. Ear Hear. Dec. 2008;29(6):907-22. doi: 10.1097/AUD.0b013e3181824616.
Moore. Loudness perception and intensity resolution. Cochlear Hearing Loss, Chapter 4, pp. 90-115, Whurr Publishers Ltd., London (1998).
Murphy, et al. Adhesion and anisotropic friction enhancements of angled heterogeneous micro-fiber arrays with spherical and spatula tips. Journal of Adhesion Science and Technology. vol. 21. No. 12-13. Aug. 2007. pp. 1281-1296. DOI: 10.1163/156856107782328380.
Murugasu, et al. Malleus-to-footplate versus malleus-to-stapes-head ossicular reconstruction prostheses: temporal bone pressure gain measurements and clinical audiological data. Otol Neurotol. Jul. 2005;26(4):572-82. DOI: 10.1097/01.mao.0000178151.44505.1b.
Musicant, et al. Direction-dependent spectral properties of cat external ear: new data and cross-species comparisons. J Acoust Soc Am. Feb. 1990. 87(2):757-781. DOI: 10.1121/1.399545.
National Semiconductor. LM4673 Boomer: Filterless, 2.65W, Mono, Class D Audio Power Amplifier. Nov. 1, 2007. 24 pages. [Data Sheet] downloaded from the Internet: URL: www.national.com/ds/LM/LM4673.pdf.
Nishihara, et al. Effect of changes in mass on middle ear function. Otolaryngol Head Neck Surg. Nov. 1993;109(5):889-910.
Notice of Allowance dated Oct. 5, 2021 for U.S. Appl. No. 16/405,716.
O'Connor, et al. Middle ear Cavity and Ear Canal Pressure-Driven Stapes Velocity Responses in Human Cadaveric Temporal Bones. J Acoust Soc Am. Sep. 2006;120(3):1517-28.
Park, et al. Design and analysis of a microelectromagnetic vibration transducer used as an implantable middle ear hearing aid. J. Micromech. Microeng. vol. 12 (2002), pp. 505-511.
Perkins, et al. Light-based Contact Hearing Device: Characterization of available Feedback Gain Margin at two device microphone locations. Presented at AAO-HNSF Annual Meeting, 2013 (Vancouver).
Perkins, et al. The EarLens Photonic Transducer: Extended bandwidth. Presented at AAO-HNSF Annual Meeting, 2011 (San Francisco).
Perkins, et al. The EarLens System: New sound transduction methods. Hear Res. Feb. 2, 2010; 10 pages total.

(56) References Cited

OTHER PUBLICATIONS

Perkins, R. Earlens tympanic contact transducer: a new method of sound transduction to the human ear. Otolaryngol Head Neck Surg. Jun. 1996;114(6):720-8.
Poosanaas, et al. Influence of sample thickness on the performance of photostrictive ceramics, J. App. Phys. Aug. 1, 1998; 84(3):1508-1512.
Puria et al. A gear in the middle ear. ARO Denver CO, 2007b.
Puria, et al. Cues above 4 kilohertz can improve spatially separated speech recognition. The Journal of the Acoustical Society of America, 2011, 129, 2384.
Puria, et al. Extending bandwidth above 4 kHz improves speech understanding in the presence of masking speech. Association for Research in Otolaryngology Annual Meeting, 2012 (San Diego).
Puria, et al. Extending bandwidth provides the brain what it needs to improve hearing in noise. First international conference on cognitive hearing science for communication, 2011 (Linkoping, Sweden).
Puria, et al. Hearing Restoration: Improved Multi-talker Speech Understanding. 5th International Symposium on Middle Ear Mechanics in Research and Otology (MEMRO), Jun. 2009 (Stanford University).
Puria, et al. Imaging, Physiology and Biomechanics of the middle ear: Towards understating the functional consequences of anatomy. Stanford Mechanics and Computation Symposium, 2005, ed Fong J.
Puria, et al. Malleus-to-footplate ossicular reconstruction prosthesis positioning: cochleovestibular pressure optimization. Otol Nerotol. May 2005; 26(3):368-379. DOI: 10.1097/01.mao.0000169788.07460.4a.
Puria, et al. Measurements and model of the cat middle ear: Evidence of tympanic membrane acoustic delay. J. Acoust. Soc. Am., 104(6):3463-3481 (Dec. 1998).
Puria, et al., Mechano-Acoustical Transformations in A. Basbaum et al., eds., The Senses: A Comprehensive Reference, v3, p. 165-201, Academic Press (2008).
Puria, et al. Middle Ear Morphometry From Cadaveric Temporal Bone MicroCT Imaging. Proceedings of the 4th International Symposium, Zurich, Switzerland, Jul. 27-30, 2006, Middle Ear Mechanics in Research and Otology, pp. 260-269.
Puria, et al. Sound-Pressure Measurements in the Cochlear Vestibule of Human-Cadaver Ears. Journal of the Acoustical Society of America. 1997; 101 (5-1): 2754-2770.
Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO.0000000000000941.
Puria, et al. The EarLens Photonic Hearing Aid. Association for Research in Otolaryngology Annual Meeting, 2012 (San Diego).
Puria, et al. The Effects of bandwidth and microphone location on understanding of masked speech by normal-hearing and hearing-impaired listeners. International Conference for Hearing Aid Research (IHCON) meeting, 2012 (Tahoe City).
Puria, et al. Tympanic-membrane and malleus-incus-complex co-adaptations for high-frequency hearing in mammals. Hear Res. May 2010;263(1-2):183-90. doi: 10.1016/j.heares.2009.10.013. Epub Oct. 28, 2009.
Puria. Measurements of human middle ear forward and reverse acoustics: implications for otoacoustic emissions. J Acoust Soc Am. May 2003;113(5):2773-89.
Puria, S. Middle Ear Hearing Devices. Chapter 10. Part of the series Springer Handbook of Auditory Research pp. 273-308. Date: Feb. 9, 2013.
Qu, et al. Carbon nanotube arrays with strong shear binding-on and easy normal lifting-off. Science. Oct. 10, 2008. 322(5899):238-342. doi: 10.1126/science.1159503.
Robles, et al. Mechanics of the mammalian cochlea. Physiol Rev. Jul. 2001;81(3):1305-52.
Roush. SiOnyx Brings "Black Silicon" into the Light; Material Could Upend Solar, Imaging Industries. Xconomy, Oct. 12, 2008, retrieved from the Internet: www.xconomy.com/boston/2008/10/12/sionyx-brings-black-silicon-into-the-light¬material-could-upend-solar-imaging-industries 4 pages total.
Rubinstein. How cochlear implants encode speech. Curr Opin Otolaryngol Head Neck Surg. Oct. 2004. 12(5):444-448. DOI: 10.1097/01.moo.0000134452.24819.c0.
School of Physics Sydney, Australia. Acoustic Compliance, Inertance and Impedance. 1-6. (2018). http://www.animations.physics.unsw.edu.au/jw/compliance-inertance-impedance.htm.
Sekaric, et al. Nanomechanical resonant structures as tunable passive modulators. Applied Physics Letters. May 2002. 80(19):3617-3619. DOI: 10.1063/1.1479209.
Shaw. Transformation of Sound Pressure Level From the Free Field to the Eardrum in the Horizontal Plane. J. Acoust. Soc. Am., vol. 56, No. 6, (Dec. 1974), 1848-1861.
Shih, et al. Shape and displacement control of beams with various boundary conditions via photostrictive optical actuators. Proc. IMECE. Nov. 2003; 1-10.
Smith. The Scientist and Engineers Guide to Digital Signal Processing. California Technical Publishing. 1997. Chapter 22. pp. 351-372.
Song, et al. The development of a non-surgical direct drive hearing device with a wireless actuator coupled to the tympanic membrane. Applied Acoustics. Dec. 31, 2013;74(12):1511-8.
Sound Design Technologies. Voyager TD Open Platform DSP System for Ultra Low Power Audio Processing—GA3280 Data Sheet. Oct. 2007. 15 pages. Retrieved from the Internet: www.sounddes.com/pdf/37601DOC.pdf.
Spolenak, et al. Effects of contact shape on the scaling of biological attachments. Proc. R. Soc. A. 2005; 461:305-319.
Stenfelt, et al. Bone-Conducted Sound: Physiological and Clinical Aspects. Otology & Neurotology, Nov. 2005; 26 (6):1245-1261.
Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.
Stuchlik, et al. Micro-Nano Actuators Driven by Polarized Light. IEEE Proc. Sci. Meas. Techn. Mar. 2004; 151(2):131-136.
Suski, et al. Optically activated ZnO/SiG2/Si cantilever beams. Sensors and Actuators A: Physical. Sep. 1990. 24(3): 221-225. https://doi.org/10.1016/0924-4247(90)80062-A.
Takagi, et al. Mechanochemical Synthesis of Piezoelectric PLZT Powder. KONA. 2003; 51(21):234-241.
Thakoor, et al. Optical microactuation in piezoceramics. Proc. SPIE. Jul. 1998; 3328:376-391.
Thompson. Tutorial on microphone technologies for directional hearing aids. Hearing Journal. Nov. 2003; 56(11):14-16,18, 20-21.
Tzou, et al. Smart Materials, Precision Sensors/Actuators, Smart Structures, and Structronic Systems. Mechanics of Advanced Materials and Structures. 2004; 11:367-393.
Uchino, et al. Photostricitve actuators. Ferroelectrics. 2001; 258:147-158.
Vickers, et al. Effects of Low-Pass Filtering on the Intelligibility of Speech in Quiet for People With and Without Dead Regions at High Frequencies. J. Acoust. Soc. Am. Aug. 2001; 110(2):1164-1175.
Vinge. Wireless Energy Transfer by Resonant Inductive Coupling. Master of Science Thesis. Chalmers University of Technology. 1-83 (2015).
Vinikman-Pinhasi, et al. Piezoelectric and Piezooptic Effects in Porous Silicon. Applied Physics Letters, Mar. 2006; 88(11): 111905-1-111905-2. DOI: 10.1063/1.2186395.
Wang, et al. Preliminary Assessment of Remote Photoelectric Excitation of an Actuator for a Hearing Implant. Proceeding of the 2005 IEEE, Engineering in Medicine and Biology 27th Annual Conference, Shanghai, China. Sep. 1-4, 2005; 6233-6234.
Web Books Publishing, "The Ear," accessed online Jan. 22, 2013, available online Nov. 2, 2007 at http://www.web-books.com/eLibrary/Medicine/Physiology/Ear/Ear.htm.
Wiener, et al. On the Sound Pressure Transformation by the Head and Auditory Meatus of the Cat. Acta Otolaryngol. Mar. 1966; 61(3):255-269.

(56) References Cited

OTHER PUBLICATIONS

Wightman, et al. Monaural Sound Localization Revisited. J Acoust Soc Am. Feb. 1997;101(2):1050-1063.
Wiki. Sliding Bias Variant 1, Dynamic Hearing (2015).
Wikipedia. Headphones. Downloaded from the Internet. Accessed Oct. 27, 2008. 7 pages. URL: http://en.wikipedia.org/wiki/Headphones.
Wikipedia. Inductive Coupling. 1-2 (Jan. 11, 2018). https://en.wikipedia.org/wiki/Inductive_coupling.
Wikipedia. Pulse-density Coupling. 1-4 (Apr. 6, 2017). https://en.wikipedia.org/wiki/Pulse-density_modulation.
Wikipedia. Resonant Inductive Coupling. 1-11 (Jan. 12, 2018). https://en.wikipedia.org/wiki/Resonant_inductive_coupling#cite_note-13.
Yao, et al. Adhesion and sliding response of a biologically inspired fibrillar surface: experimental observations, J. R. Soc. Interface (2008) 5, 723-733 doi:10.1098/rsif.2007.1225 Published online Oct. 30, 2007.
Yao, et al. Maximum strength for intermolecular adhesion of nanospheres at an optimal size. J R Soc Interface. Nov. 6, 2008;5(28):1363-70. doi: 10.1098/rsif.2008.0066.
Yi, et al. Piezoelectric Microspeaker with Compressive Nitride Diaphragm. The Fifteenth IEEE International Conference on Micro Electro Mechanical Systems, 2002; 260-263.
Yu, et al. Photomechanics: Directed bending of a polymer film by light. Nature. Sep. 11, 2003;425(6954):145. DOI: 10.1038/425145a.

\* cited by examiner

IMPRESSION PROCEDURE

CROSS-REFERENCE

This application is a continuation of U.S. patent application Ser. No. 16/405,716, filed May 7, 2019, now U.S. Pat. No. 11,166,114; which is a continuation of PCT Application No. PCT/US2017/061388, filed Nov. 13, 2017; which claims the benefit of U.S. Provisional Application Nos. 62/564,574, filed Sep. 28, 2017, and 62/422,535, filed Nov. 15, 2016; which applications are incorporated herein by reference.

BACKGROUND OF THE INVENTION

Impressions are used in the hearing aid industry to provide models of the hearing aid user's ear canal. These impressions taken of the lateral end of the ear canal may be used to create ear tips (the portion of the hearing aid that fits into the lateral end of the ear canal) which conform to the actual shape of the user's ear canal. These custom ear tips generally provide better fit and comfort than ear tips which are not custom fitted to the customer's particular ear canal shape. In contact hearing aid systems which include hearing aid components (e.g., contact hearing devices) which are positioned on and conform to the shape of the user's tympanic membrane (ear drum), impressions may be taken that extend from the lateral end of the ear canal (e.g., near the pinna) to the medial end of the canal (e.g., at or near the tympanic membrane). These full canal impressions may be used to manufacture both custom ear tips and custom contact hearing aid components, such as contact hearing devices, for the user's tympanic membrane. The methods of taking these full canal impressions, along with the characteristics of the materials used to take the impressions will have an impact on the overall fit, comfort and utility of the components manufactured using that full impression. As used herein, ear tip may refer to a conventional hearing aid ear tip (e.g., including a receiver) or to a light tip which may be a component of a contact hearing system.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same or like elements. The drawings are not necessarily to scale, emphasis instead being placed upon illustrating the principles of the preferred embodiments.

DETAILED DESCRIPTION OF THE INVENTION

Figure 1:
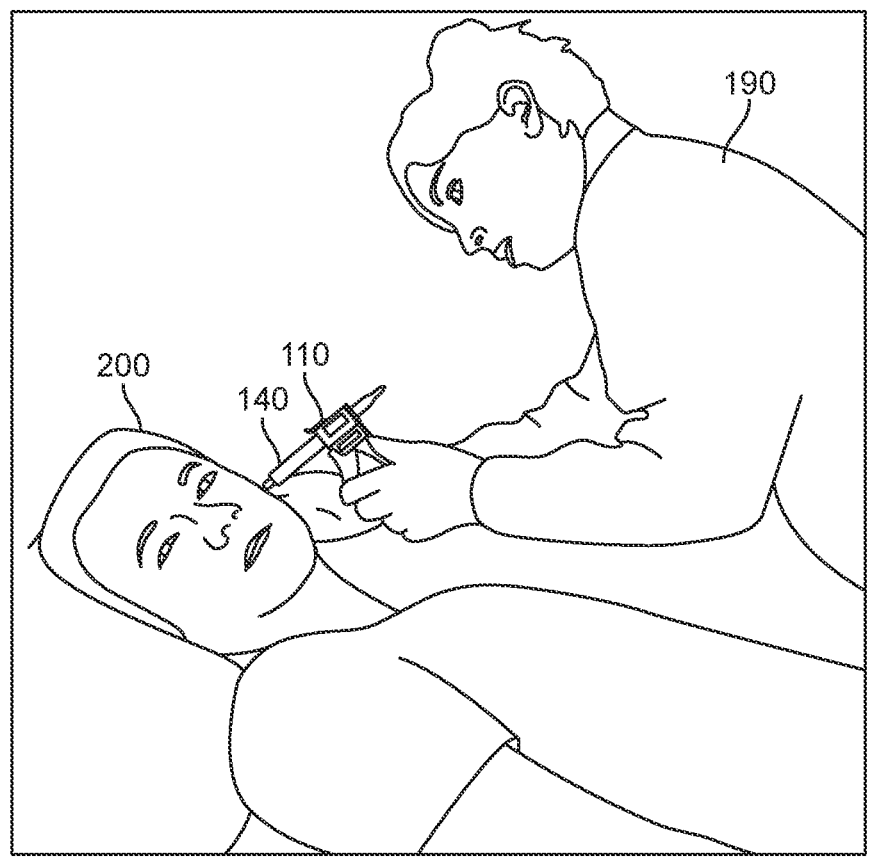
FIG. 1 illustrates an impression being taken with the subject in a supine position and a health care professional injecting the impression material into the subject's ear canal.

FIG. 1 illustrates an impression being taken with the subject in a supine position and a health care professional 190 injecting the impression material into the subject's ear canal. In one embodiment of the invention, two different impressions are taken and digitally scanned. In this embodiment, the different impressions represent two different (although overlapping) portions of the ear canal anatomy and are made using two different viscosities of impression material. In this embodiment, the first impression (Impression 1) may be either: a) an impression of the whole ear canal, down to and including the tympanic membrane or b) an impression of the medial portion of the ear canal from approximately the beginning of the bony canal to and including the tympanic membrane. The Impression 1 impressions may be made using a low viscosity impression material with the subject lying in a supine position (the supine position is chosen to prevent the low viscosity impression material from running out of the subject's ear before it cures). The use of a low viscosity material for Impression 1 enables the impression to reflect the fine detail of the anatomy of the medial ear canal since it flows easily into all areas of the medial ear canal.

Figure 2:
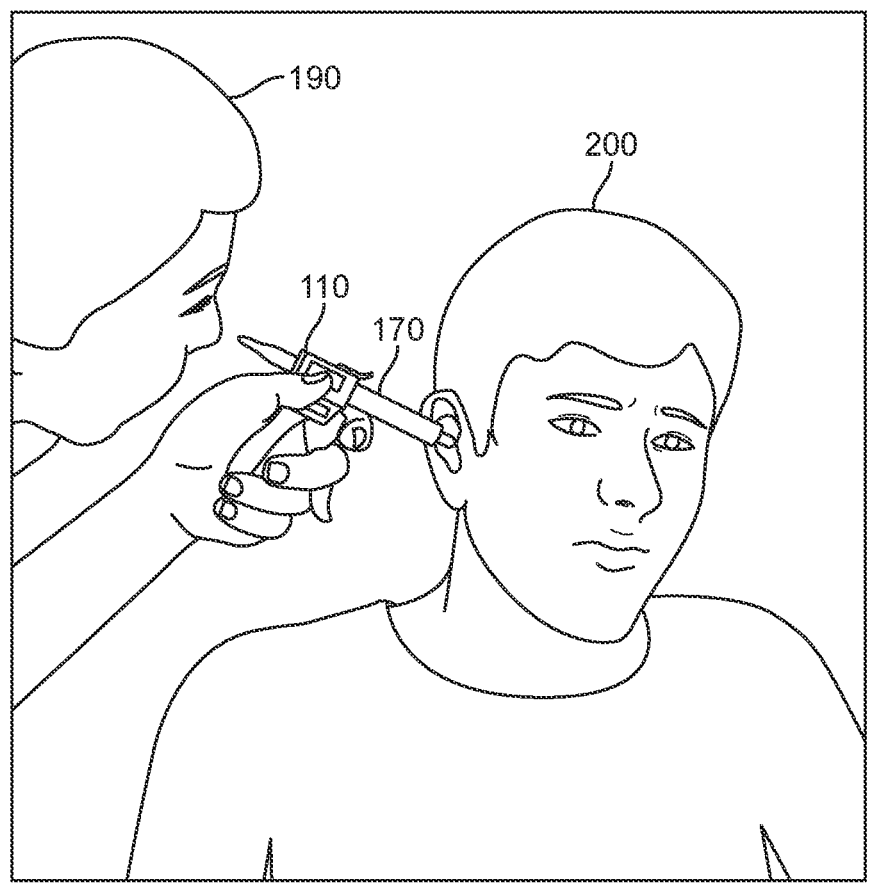
FIG. 2 illustrates an impression being taken with the subject in an upright position and a health care professional injecting the impression material into the subject's ear canal.

FIG. 2 illustrates an impression being taken with the subject in an upright position and a health care professional 190 injecting the impression material into the subject's ear canal. In embodiments of the invention, the second impression (Impression 2) is an impression of the lateral portion of the ear canal wherein the impression extends from a point in the subject's bony canal (but not as deep as the tympanic membrane) to the subject's concha bowl. Impression 2 is made using a high viscosity material with the subject in an upright (sitting) position to obtain an impression of the lateral ear canal which is most representative of the shape of the ear canal when the subject is in the position where he/she is most likely to be when using the hearing aids (e.g., sitting or standing). As the impression material cures, the high viscosity material exerts pressure on the tissue in the lateral ear canal, causing slight compression of the tissue in the lateral ear canal, thus creating an ear tip which fits snugly into the lateral ear canal and will not migrate out of the ear canal. The pressure is created by the viscosity of the high viscosity impression material and the force it exerts on the ear canal.

In one embodiment of the invention, once the impressions are made they may be shipped back to the manufacturer where they are cleaned and placed into a digital scanner. The digital scanner is used to make digital models of the impressions, which digital models may be representative of all or sections of the subject's ear canal. Where Impression 1 is an impression of the whole ear canal, down to and including the tympanic membrane, the output of the scanner for Impression 1 is a digital model of the full ear canal which includes a medial portion representative of the shape, size and surface structure of the entire ear canal, including the medial portion, tympanic membrane and sulcus region. Where Impression 1 is an impression of the medial end of the ear canal, down to and including the tympanic membrane, the output of the scanner for Impression 1 is a digital model of the medial end of the ear canal representative of the shape, size and surface structure of the tympanic membrane and sulcus region. The output of the scanner for Impression 2 is a digital model which includes a first portion representative of the shape, size and surface structure of the lateral end of the ear canal and may also include a second portion representing a medial end of Impression 2.

Once Impression 1 and Impression 2 are complete, and have been scanned using, for example, a digital scanner, digital representations of Impression 1 and Impression 2 are created. The resulting scans are combined by the technique described below to create a single digital representation of the ear canal of the subject, including digital features representative of the surface of the subject's ear canal. The resulting digital representation will represent the subject's ear canal from the concha bowl to the tympanic membrane. This single digital representation combines the representation resulting from the use of a high viscosity impression material to create a model of the lateral ear canal (higher pressure conforms to soft tissue of lateral ear canal) and the representation resulting from the use of a low viscosity impression material to create a model of the medial portion of the ear canal (lower viscosity allows it to flow evenly into the farthest reaches of the ear canal without creating bubbles or missing areas which might ruin the impression and make it difficult to create a resulting product). The low viscosity impression material further allows the impression to capture the fine detail of the tympanic membrane and sulcus region.

Figure 3:
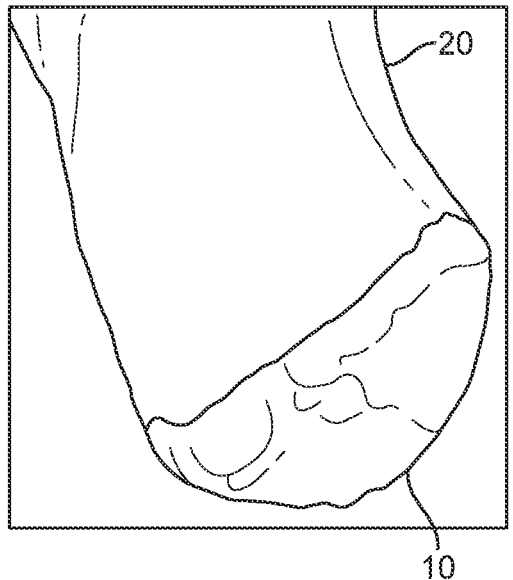
FIG. 3 illustrates a scanned image of the medial end of a lateral ear canal impression.
Figure 4:
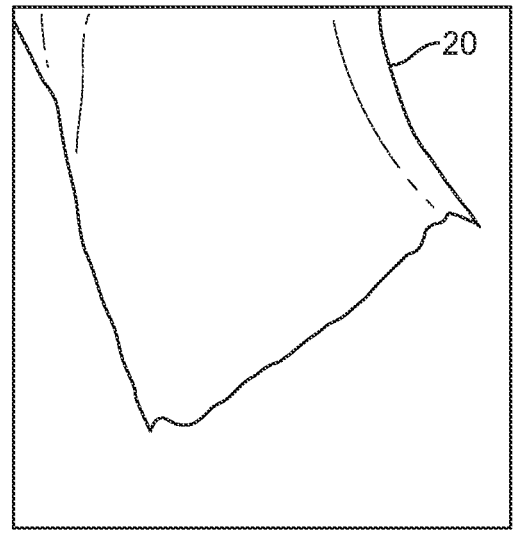
FIG. 4 illustrates a scanned image of a lateral ear canal impression with a portion of the medial end removed.

As illustrated in FIGS. 3 and 4, once the scans are completed, the digital model (scan) of Impression 2 may be "cleaned up" (i.e., digitally altered) to, for example, remove data which is not representative of the anatomy of the subject. This extraneous data may result from impression material at the medial end of the impression which did not contact any portion of the ear canal. In the digital model, this additional data, which is not representative of the actual shape of the subject's ear canal be referred to as noise. See, for example, the portion of digital model 20 labeled 10 in FIG. 3, this portion of digital model 20 has been removed in FIG. 4.

Figure 5:
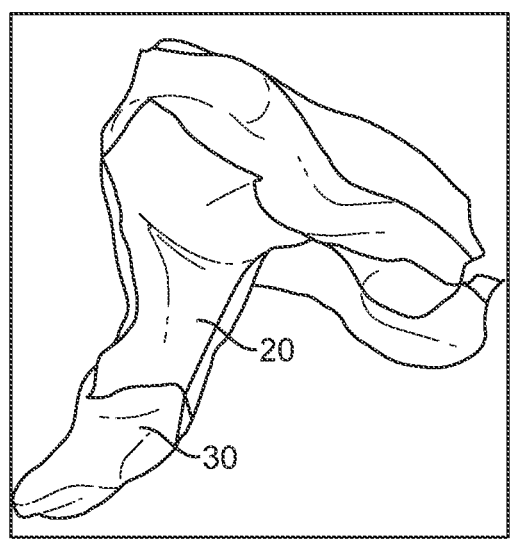
FIG. 5 illustrates a scanned image of a lateral ear canal impression overlaid over a scanned image of a full canal impression.

Once the extraneous data is removed from digital model 2, the corresponding portions of the data files for models 1 and 2 may be overlaid to obtain a best fit alignment for the overall impressions. This best fit analysis may be performed either manually or electronically. In either case, the two models are overlaid and the features are used to get a best fit alignment. See, for example, FIG. 5 where digital model 20 of the medial end of the subject's ear canal is overlaid over digital model 30 of the entire ear canal of the subject. In FIG. 5, the two digital models are manipulated until the corresponding alignment regions of digital model 20 and digital model 30 align as closely as possible. The required manipulation may be done either manually or using alignment algorithms.

Figure 6:
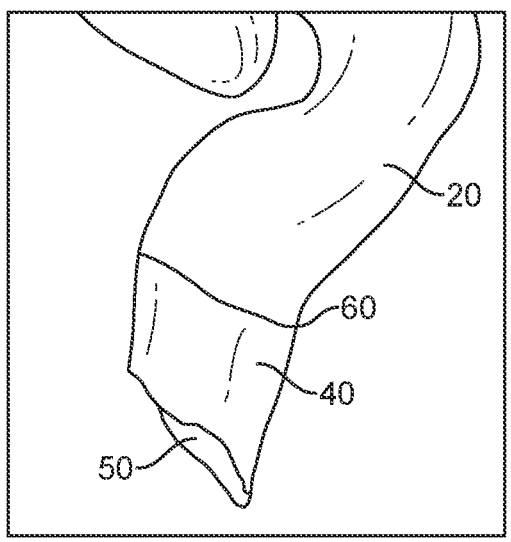
FIG. 6 illustrates a digital model of a lateral impression including an overlapping region.

Once digital models 20 and 30 are in rough alignment, an alignment region 40 may be identified on digital model 20 as illustrated in FIG. 6. The alignment region 40 generally extends from the medial end 50 of digital model 20 to a starting point 60 representative of a predefined portion of the bony canal of the subject, which may be, for example, the beginning of the bony canal. The starting point 60 for the alignment region 40 may, alternatively, be defined with respect to other features of the ear canal, such as, for example, being defined as medial to the second bend. In FIG. 6, alignment region 40 extends from starting point 60 to medial end 50 of digital model 20. The bony canal is selected as alignment region 40 because it is an area where the two digital scans overlap. In addition the bony canal is the region of the ear canal least subject to changes in shape resulting from body position and/or pressure from the impression material, particularly the high viscosity impression material resulting from the curing process. The bony canal region is, therefore, believed to be the region in which the two digital models are most likely to be identical and/or similar enough to enable the two digital scans to be aligned. Thus, the alignment region is likely to be substantially the same in digital model 20 and digital model 30.

Figure 7:
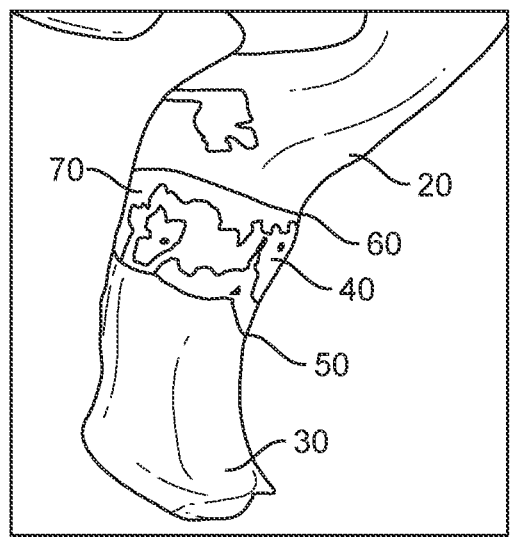
FIG. 7 illustrates a digital model of a combined medial and lateral impression, including an overlapping region.
Figure 8:
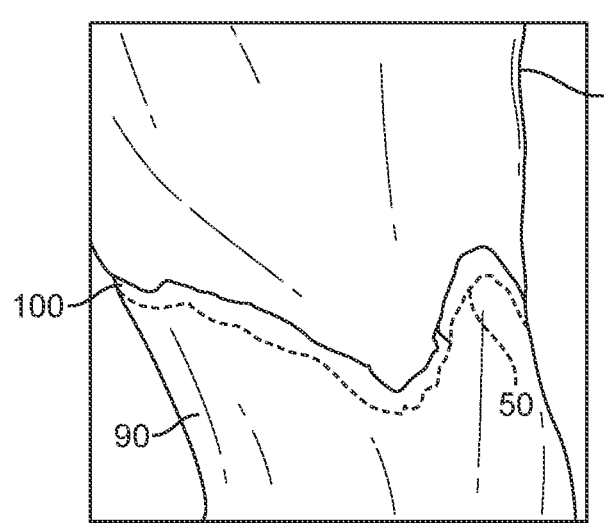
FIG. 8 illustrates a digital model of a combined medial and lateral impression, including a junction.
Figure 9:
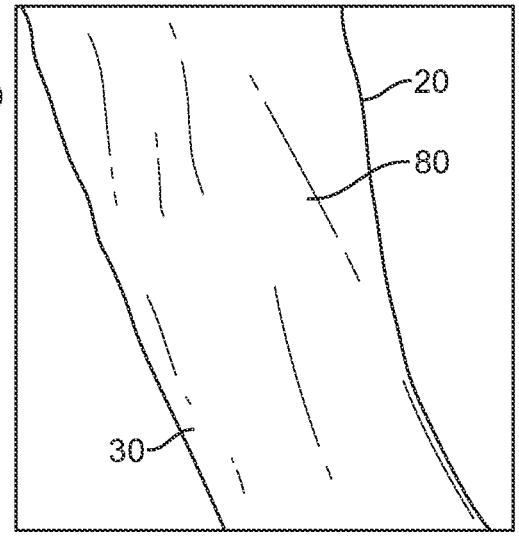
FIG. 9 illustrates a digital model of a combined medial and lateral impression after the junction has been smoothed.

Once the alignment region 40 is defined in digital model 20, the alignment region 40 may be locally aligned with the bony canal region 70 of digital model 30 as illustrated in FIG. 7. In embodiments of the invention, the alignment region 40 may be on the order of approximately 3 millimeters. Once the alignment region 40 is fully aligned with bony canal region 70, the portion of digital model 20 which is medial to medial end 50 of digital model 30 is deleted. In embodiments of the invention, a small additional portion of digital model 30 is also deleted, leaving a small gap 100 as illustrated in FIG. 8. In FIG. 9, gap 100 is filled and smoothed to create a complete digital model 80 which incorporates data from digital model 20 as representative of the lateral ear canal and which incorporates data from digital model 30 as representative of the medial ear canal. This combined digital model 80 impression may then be used to design components which reside in the ear canal, such components may include ear tips, light tips, contact hearing devices, tympanic lenses and/or other components of contact hearing systems.

In alternative embodiments of the invention, complete digital model 80 may be made from a hybrid impression wherein the low viscosity impression material is first poured into the subject's ear canal, followed by the high viscosity impression material to create a single impression capturing the ear canal of the subject from the tympanic membrane to the concha bowl.

In alternative embodiments of the invention, the low viscosity impression may be left to fully cure while the subject is supine before moving the subject to an upright position and adding the high viscosity impression material. In this embodiment the low viscosity impression material may be used as an oto-block that prevents the high viscosity impression material from contacting the tympanic membrane and/or the medial end of the subject's ear canal.

In embodiments of the invention, the high viscosity impression material is bonded to the low viscosity impression material prior to removing the hybrid impression from the subject's ear canal.

In embodiments of the invention, one method of taking a hybrid impression of the ear canal of a hearing aid subject involves generating an impression using two separate materials through a predetermined series of steps, including ensuring that elements of the method are performed at predetermined time intervals. In embodiments of the invention, the predetermined time intervals may be determined as a function of characteristics of the impression material being used. In embodiments of the invention, such characteristics may include, for example, the curing time of the impression material. In embodiments of the invention, such characteristics may include, for example, the viscosity of the impression material.

In embodiments of the invention, the method may include the step of raising the subject from a supine to a sitting (or standing) position at a predetermined time or after a predetermined event has occurred, for example within a predetermined interval after initially depositing impression material in the ear canal of the subject. Embodiments of the invention, which include the forgoing step, may be referred to as Seated Hybrid Impressions. In embodiments of the invention, the time interval may be calculated such that the subject is raised before the impression material used in the supine position is fully cured. In embodiments of the invention, the time interval may be calculated such that the subject is raised after the impression material used when the subject is in the supine position has cured to a point where it is sufficiently viscous that it does not flow out of the ear canal. In embodiments of the invention, the timing of raising the subject from a supine position into an upright position is dependent upon the timing of the transition of the impression material from a viscous material to a gel. In embodiments of the invention, a sol to gel transition, in which the material is transformed from what is technically a liquid (sol) into a solid (gel) is the preferred point for raising the subject from a supine to an upright position. In embodiments of the invention, it may be possible to raise the subject before the impression material transitions from a liquid to a solid. For example, the subject may be raised when the impression material's viscosity increases enough to prevent the impression material from flowing out of the ear when the subject is raised to the upright position.

In embodiments of the invention, materials which are suitable for creating impressions of the medial end of the ear canal include materials which initially have a low viscosity, such as, for example, a viscosity of less than 10 centipoise ("cPs") and/or a viscosity of between approximately 10 cPs and 20,000 cPs. Impression materials suitable for use in low viscosity applications of the present invention may be referred to herein as Low Viscosity Impression Materials or LVIM. In embodiments of the invention, materials suitable for use as an LVIM may have a hardness of approximately 15±2 Shore A. In embodiments of the invention, materials suitable for use as an LVIM may have an Elongation at break of greater than approximately 250%. In embodiments of the invention, the viscosity values set forth above represent the viscosity of the impression material as it is initially deposited in the ear canal of the subject using, for example impression dispensing gun 110. In embodiments of the invention, wherein the impression material is a two part material which is mixed prior to injecting it into the subject's ear canal, the viscosity values set forth above represent the viscosity of the impression material immediately following the mixing of the two materials which comprise the two part impression material.

In embodiments of the invention, materials which are suitable for creating impressions of the lateral end of the ear canal include materials which have a higher viscosity than the Low Viscosity Impression Materials, such as, for example, a viscosity of more than 100 cPs and/or a viscosity of between approximately 100 and 100,000 cPs. Impression materials suitable for use in high viscosity applications of the present invention may be referred to herein as High Viscosity Impression Materials or HVIM. In embodiments of the invention, materials suitable for use as an HVIM may have a hardness of approximately 30±3 Shore A. In embodiments of the invention, materials suitable for use as a HVIM may include Otoform A softX having a hardness of approximately 25+/−2 Shore A.

In embodiments of the invention, materials suitable for creating impressions may include two-part, platinum cure silicones. Once the two components of the impression materials are mixed together, these materials increase in viscosity over time and ultimately cure into a solid material. After a period of time, the material undergoes what is known as a sol-gel transition, in which the material is transformed from a liquid state (sol) to a soft, solid state (gel). The gel may continue to cross-link (or cure) over time so that it becomes harder than the gel, and eventually is fully cured. The fully cured material will not undergo any shape change when it is released from a physical constraint, such as when it is removed from an ear canal. Instead, the fully cured material retains the geometry it had when it transitioned from a gel to a fully cured solid.

In embodiments of the invention, factors which can affect the timing of moving a subject from a supine to an upright position while making an impression of the subject's ear canal include: i) the temperature of the impression materials (higher temperatures result in faster cures); ii) the ratio of the two components comprising the impression material (1:1, 2:1, or other ratios); iii) the initial concentration of platinum catalyst; and iv) the presence of any inhibitors of the platinum catalyst (such as alcohols, amine-containing chemicals, sulfur-containing chemicals or materials, and phosphorous-containing chemicals, among others). For example, certain HVIM materials cure faster than the LVIM materials, with the former reaching a gel state in about 1 minute, while the latter reaches a gel state in about 2 minutes at normal body temperature.

In embodiments of the invention, the method may use a serial procedure to gather a full seated Hybrid Impression from one ear before moving to the second ear. Alternatively, a health care professional may inject the LVIM materials into both ear canals of the subject before moving the subject from a supine to an upright position. In an embodiment of the invention, the health care professional may alternate between the right and left ears, for example, injecting LVIM in the left ear followed by HVIM in that ear, followed by LVIM in the right ear and then HVIM in the right ear. In embodiments of the invention, the patient may move from a sitting position to a supine position after injecting the first HVIM material but before it is fully cured.

In embodiments of the invention, the following steps may be used to create a Seated Hybrid Impression. The steps include:

1. The step of reclining the subject into a supine position, putting Low Viscosity Impression Materials into the subject's ear such that the LVIM extends into the medial end of the subject's ear canal. In embodiments of the invention, the physician will continue to put LVIM into the ear canal of the supine subject until the LVIM reaches a predetermined region of the subject's ear canal. In embodiments of the invention, the predetermined region may be the subject's Cartilaginous Boney Junction ("CBJ"). In embodiments of the invention, the predetermined region may be a point just beyond the subject's CBJ. In embodiments of the invention, the predetermined region may be the region designated as the lateral smooth glandular tissue area. In embodiments of the invention, the predetermined region may be the medial end of the second bend in the subject's ear canal. In embodiments of the invention, the physician may continue to put LVIM into the subject's ear canal until the LVIM material is far enough lateral to allow the injection tool for the HVIM to reach the lateral end of the LVIM material. In embodiments of the invention, the injection of LVIM must be completed within a first predetermined period of time. In embodiments of the invention, the first predetermined period of time may be the time required for the LVIM to increase in viscosity such that it will no longer flow out of the subject's ear canal. In embodiments of the invention, the first predetermined period of time may be less than the time required for the LVIM to fully harden or cure. In embodiments of the invention, the first predetermined period of time may be approximately one minute and 15 seconds following the initial mixing of LVIM material for deposition in the subject's ear canal. In embodiments of the invention, the LVIM material is a 2 part material which only begins to cure after the two parts are mixed together. In embodiments of the invention where the deposition of LVIM takes less than the first predetermined period of time, the subject may be maintained in the supine position until the end of the first predetermined period of time. In embodiments of the invention, the subject may be raised to an upright position just after the LVIM transitions from a viscous liquid to a gel but before it fully cures. In embodiments of the invention, the subject may be raised into an upright position before the LVIM gel fully cures.

2. The step of moving the subject into an upright (e.g., sitting or standing) position and allowing the LVIM material to fully harden or cure. In embodiments of the invention, the subject may be moved into an upright position after the end of the first predetermined period of time. In embodiments of the invention, the subject must be fully upright by the end of a second predetermined period of time where in the second predetermined period of time may be measured from the initial mixing of the LVIM prior to dispensing in the subject's ear canal. In embodiments of the invention, the second predetermined period of time, as measured from the initial dispensing of the LVIM in the subject's ear may be from approximately one minute and thirty seconds to two minutes and thirty seconds.

3. The step of injecting HVIM into the subject's ear canal. In embodiments of the invention, once the subject is in an upright position, HVIM material may be injected into the ear canal, starting at the lateral end of the LVIM impression material and working out to the end of the ear canal. In the embodiments of the invention, HVIM material may extend into the concha bowl of the subject. In embodiments of the invention, the HVIM material may extend to the level of the subject's scapha. In embodiments of the invention, the HVIM material may extend far enough to cover the subject's tragus.

4. The step of curing the HVIM material. In embodiments of the invention, the HVIM material may then be allowed to cure.
   a. Once the LVIM material is fully cured, the next step of the method may be to leave the first impression in the subject's ear, and take an impression of the subject's other ear using the steps set forth above.

5. The step of removing the hybrid impression from the subject's ear. In embodiments of the invention, both the LVIM and HVIM material may then be allowed to cure before removing the fully cured hybrid impression from the subject's ear. In embodiments of the invention, the process of fully curing the LVIM and HVIM material may take approximately eight minutes from the time the initial LVIM material was injected into the subject's ear canal. In embodiments of the invention, the physician may wait for a period of more than approximately eight minutes from the initial injection of the LVIM material to remove the hybrid impression from the subject's ear.
   a. If they have not already done so, once the hybrid impression has been removed from the subject's first ear, the physician may use the steps outlined above to take an impression of the subject's second ear.

In embodiments of the invention, the procedure described herein may be augmented by applying a cap of HVIM material over the LVIM material prior to moving the subject into an upright position as described in Step 2 above. In embodiments of the invention, the cap of HVIM material may be less than the full HVIM impression. In embodiments of the invention, the cap of HVIM material may be small enough to leave room in the subject's ear canal for additional HVIM material once the subject has been raised to the upright position. In embodiments of the invention, the cap of HVIM material may be approximately 3 millimeters to 20 millimeters thick.

The following timeline is illustrative of the timing of various steps of the sitting hybrid impression process according to one embodiment of the present invention. Sample Impression Timeline:

| Impression Method | | | | Total Time (min:sec) | | | | |
|---|---|---|---|---|---|---|---|---|
| Hybrid | | | | 13:15 | | | | |
| 0:15 | 0:30 | 0:45 | 1:00 | 1:15 | 1:30 | 1:45 | 2:00 | 2:15 |
| | Capture LVIM, Ear 1 (75 Sec) | | | | Sit (15 Sec) | Capture HVIM, Ear 1 (30 Sec) | | |
| 2:30 | 2:45 | 3:00 | 3:15 | 3:30 | 3:45 | 4:00 | 4:15 | 4:30 |
| | | | | HVIM Cure, Ear 1 (150 Sec) | | | | |
| 4:45 | 5:00 | 5:15 | 5:30 | 5:45 | 6:00 | 6:15 | 6:30 | 6:45 |
| Recline (15 Sec) | | Capture LVIM, Ear 2 (75 Sec) | | | | Sit (15 Sec) | Capture HVIM, Ear 2 (30 Sec) | |
| 7:00 | 7:15 | 7:30 | 7:45 | 8:00 | 8:15 | 8:30 | 8:45 | 9:00 |

-continued

| HVIM + LVIM Cure (6 min, 30 Sec) | | | | | | | | |
|---|---|---|---|---|---|---|---|---|
| 9:15 | 9:30 | 9:45 | 10:00 | 10:15 | 10:30 | 10:45 | 11:00 | 11:15 |

| HVIM + LVIM Cure (6 min, 30 Sec) | | | | | | | |
|---|---|---|---|---|---|---|---|
| 11:30 | 11:45 | 12:00 | 12:15 | 12:30 | 12:45 | 13:00 | 13:15 |

| HVIM + LVIM Cure (6 min, 30 Sec) |
|---|

In embodiments of the invention, the method may include placing the subject in a supine position and injecting LVIM into the subject's ear using enough LVIM to reach a predetermined point in the subject's ear canal. The subject would then remain in the supine position for approximately one minute and fifteen seconds before being moved to an upright position (e.g., sitting or standing). Approximately one minute and forty-five seconds later, the health care professional would inject HVIM into the subject's ear canal, using enough HVIM material to fill the ear canal to at least a point where the HVIM would be visible at the ear canal opening. In embodiments of the invention, the HVIM may be used to fill the ear canal to the Concha Cymba. In embodiments of the invention, the HVIM may be used to fill the ear canal to the concha bowl. In embodiments of the invention, the hybrid impression (including both the LVIM and HVIM) would be pulled from the subject's ear canal once the combined impression has bonded and fully cured.

In embodiments of the invention the low viscosity impression material may be a material particularly suited to making medial impressions. The LVIM may be Formasil AB (available from Dreve, Unna, Germany). The LVIM may be a low viscosity, two-part platinum cure silicone. The LVIM may have a viscosity which is sufficiently low, prior to mixing (approximately 1 to 1000 cPs), to ensure that it flows easily into the sulcus region and covers the tympanic membrane when it is injected into the ear canal of a subject. The LVIM may be selected to set up quickly. The LVIM may be selected to have a sol-gel transition time at 37° C. of approximately 1 to 3 minutes. The LVIM may be selected such that it becomes fully cured within 5 minutes of being injected into the ear canal of a subject. The LVIM may be selected to be a soft material, with a durometer of approximately 15±2 Shore A and a tensile strength of greater than approximately 1 MPa. The LVIM may be selected to have an excellent elastic recovery, such as an elastic recovery which is greater than approximately 99%.

In embodiments of the invention, the high viscosity impression material may be particularly suited to making lateral impressions. The HVIM may be Otoform A softX (available from Dreve, Unna, Germany). The HVIM may have a relatively high viscosity. The HVIM may be a two-part platinum cure silicone. The HVIM may have a viscosity prior to mixing of approximately 1,000 to approximately 100,000 cPs. The HVIM may be selected to have a viscosity which limits its ability to flow all the way down to the sulcus region, making it suitable for use in the outer, more lateral, portion of the subject's ear canal. The HVIM may be selected to set up faster than the LVIM. The HVIM may have a sol-gel transition time at 37° C. of approximately 30 seconds to approximately 1 minute. The HVIM may be selected to fully cure within approximately 4 minutes. The HVIM may be selected to be less soft than the LVIM. The HVIM may be selected to have a durometer of approximately 25±2 Shore A after complete curing. The HVIM may be selected to have an elastic recovery of greater than approximately 99%.

In one embodiment, the present invention is directed to a method of creating a hearing system for a subject, the method including the steps of: taking a first impression of a first portion of an ear canal using an impression material having a first viscosity; taking a second impression of a second portion of the ear canal using an impression material having a second viscosity; digitally scanning the first impression to create a first digital model; digitally scanning the second impression to create a second digital model; merging the first digital model with the second digital model to create a merged model where the lateral portion of the merged model is comprised of at least a portion of the first digital model and the medial portion of the merged model is comprised of at least a portion of the second model; and, using the merged digital model to manufacture at least one of an ear tip and a contact hearing device. In further embodiments of the invention, the method may include the step of raising the subject from a supine position to an upright position prior to the step of taking a second impression. In further embodiments of the invention, the second impression may be taken after the first impression is removed from the subject's ear canal. In further embodiments of the invention, the first impression may be taken after the second impression is removed from the subject's ear canal. In further embodiments of the invention, the first impression is an impression of the subject's whole ear canal, including the tympanic membrane, bony canal and lateral end of the ear canal. In further embodiments of the invention, the first and second portions of the ear canal overlap. In further embodiments of the invention, the first viscosity is lower than the second viscosity.

In one embodiment, the present invention is directed to a method of creating a hearing system for a subject, the method including the steps of: creating a hybrid impression of a subject's ear canal, the method of creating a hybrid impression including the steps of: injecting a low viscosity impression material into a first portion of the ear canal, wherein the low viscosity impression material is injected with the subject in a supine position; and, injecting a high viscosity impression material into a second portion of the ear canal lateral to the first portion, wherein the high viscosity impression material is injected with the subject in an upright position; digitally scanning the hybrid impression to create a digital model of the subject's ear canal; and, using the digital model to manufacture at least one of ear tip and a contact hearing device. In further embodiments of the invention, the initial viscosity of the low viscosity impression material is lower than the initial viscosity of the high viscosity impression material. In further embodiments of the invention, the method further includes the step of raising the subject from a supine position to an upright position prior to injecting the high viscosity impression material. In further embodiments of the invention, the subject is raised from a supine to an upright position after the low viscosity impression material has transitioned from a liquid to a gel state. In further embodiments of the invention, the subject is raised from a supine to an upright position before the low viscosity impression material is fully cured. In further embodiments of the invention, the step of raising the subject from a supine position to an upright position occurs at a predetermined time after the beginning of the step of injecting a low viscosity impression material. In further embodiments of the invention, the step of raising the subject from a supine position to an upright position occurs before the low viscosity impression material cures into a gel state. In further embodiments of the invention, the step of raising the subject from a supine position to an upright position occurs after the viscosity of the low viscosity impression material has increased to a viscosity where the low viscosity impression material no longer flows when subjected to gravitational forces. In further embodiments of the invention, the first and second portions of the ear canal do not overlap. In further embodiments of the invention the low viscosity impression is bonded to the high viscosity impression.

In one embodiment, the present invention is directed to a method of creating components of a hearing system for a subject, the method including the steps of: digitally scanning a first impression to create a first digital model, wherein the first impression is an impression of a first portion of an ear canal taken using a low viscosity impression material having a first viscosity and wherein the first impression has been taken with the subject in a supine position; digitally scanning a second impression to create a second digital model, wherein the second impression is an impression of a second portion of an ear canal taken using a high viscosity impression material having a second viscosity, and wherein the second impression has been taken with the subject in an upright position; merging the first digital model with the second digital model to create a merged model where the medial portion of the merged model is comprised of the first digital model and the lateral portion of the merged model is comprised of the second model; using the merged digital model to manufacture at least one of an ear tip and a contact hearing device. In further embodiments of the invention, the first and second portions of the ear canal overlap. In further embodiments of the invention, the first and second digital models include digital models of the overlapping portions of the ear canal. In further embodiments of the invention, the merging step includes aligning the digital models of the overlapping portions of ear canal. In further embodiments of the invention, the merging step includes aligning points within the digital models of the overlapping portions of the ear canal. In further embodiments of the invention, the first impression is an impression of the subject's whole ear canal, including the tympanic membrane, bony canal and lateral end of the ear canal.

In one embodiment, the present invention is directed to a method of creating components of a hearing system for a subject, the method including the steps of: digitally scanning a hybrid impression to create a digital model, wherein the hybrid impression has been created using a method including the steps of: injecting a low viscosity impression material into a first portion of the ear canal, wherein the low viscosity impression material is injected with the subject in a supine position; and, injecting a high viscosity impression material into a second portion of the ear canal lateral to the first portion, wherein the high viscosity impression material is injected with the subject in an upright position; using the merged digital model to manufacture at least one of an ear tip and a contact hearing device. In further embodiments of the invention, the low viscosity impression material has an initial viscosity which is lower than the initial viscosity of the high viscosity material. In further embodiments of the invention, the low viscosity impression material is bonded to the high viscosity impression material to create the hybrid impression.

In one embodiment the present invention is directed to a kit including: a low viscosity material for use in making impressions of the medial end of a subject's ear canal; and, a high viscosity material for use in making impressions of the lateral end of a subject's ear canal, wherein the initial viscosity of the low viscosity material is lower than the initial viscosity of the high viscosity material; and, at least one dispenser adapted to dispense at least one of the low viscosity material or the high viscosity material.

In one embodiment, the present invention is directed to a kit including: at least one impression dispensing gun; at least one dispenser of low viscosity impression material; at least one low viscosity impression material dispensing tip; at least one dispenser of high viscosity impression material; and, at least one high viscosity impression material dispensing tip. In further embodiments of the invention, the kit further includes at least one dispenser of mineral oil. In further embodiments of the invention, the kit further includes at least one mineral oil basin. In further embodiments of the invention, the kit further includes at least one impression return box.

Figure 10:
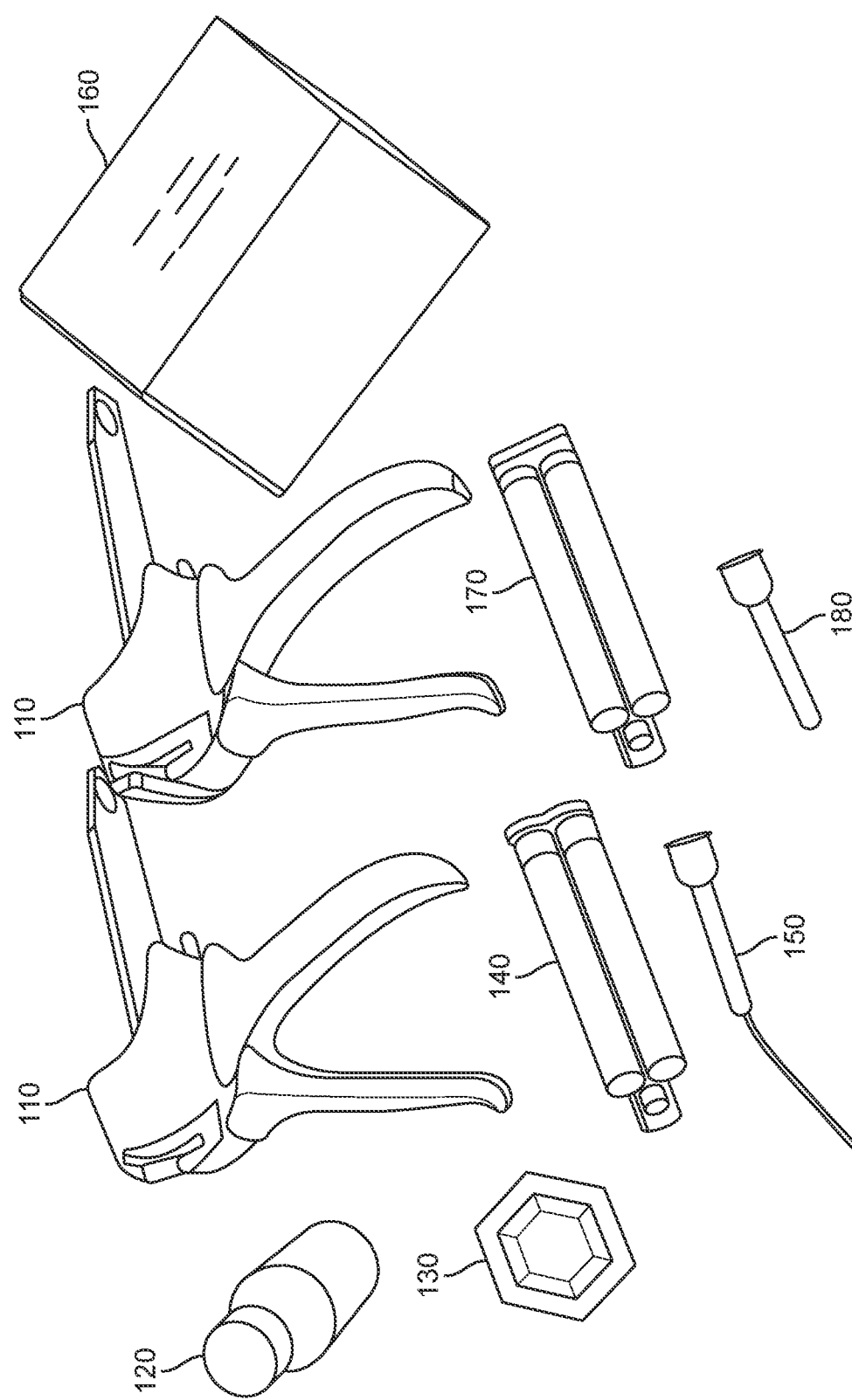
FIG. 10 illustrates an impression kit according to one embodiment of the present invention.

Embodiments of the invention may include a kit useful in practicing the methods of the present invention. As illustrated in FIG. 10, in one embodiment, the kit may include one or more of the following components: impression dispensing guns 110; mineral oil 120; a mineral oil basin (hex dish) 130; low viscosity impression material 140; low viscosity impression material dispensing tip 150; impression return box 160; high viscosity impression material 170; and, high viscosity impression material dispensing tip 180.

Definitions

Audio Processor (BTE)—A system for receiving and processing audio signals. In embodiments of the invention, audio processors may include one or more microphones adapted to receive audio which reaches the subject's ear. In embodiments of the invention, the audio processor may include one or more components for processing the received sound. In embodiments of the invention, the audio processor may include digital signal processing electronics and software which are adapted to process the received sound. In embodiments of the invention, processing of the received sound may include amplification of the received sound.

Contact Hearing System—A system including a contact hearing device, an ear tip, and an audio processor. In embodiments of the invention, contact hearing systems may also include an external communication device. An example of such system is an EarLens hearing-aid device that transmits audio signal by laser to tympanic membrane transducer (TMT) which is placed on an ear drum.

Contact Hearing Device (Tympanic Contact Actuator (TCA)/Tympanic Lens)—a tiny actuator connected to a customized ring-shaped support platform that floats on the ear canal around the eardrum, and resides in the ear much like a contact lens resides on the surface of the eye, where the actuator directly vibrates the eardrum which causes energy to be transmitted through the middle and inner ears to stimulate the brain and produce the perception of sound. In embodiments of the invention, the contact hearing device may include a photodetector, a microactuator connected to the photodetector, and a support structure supporting the photodetector and microactuator.

Ear Tip (Light Tip)—A structure designed to be placed into and reside in the ear canal of a hearing aid user, where the structure is adapted to receive signals intended to be transmitted to the user's tympanic membrane or to a device positioned on or near the user's tympanic membrane (such as, for example, a Contact Hearing Device). In one embodiment of the invention, the signals may be transmitted by light, using, for example, a laser positioned in the light tip. In one embodiment of the invention, the signals may be transmitted using radio frequency, using, for example, an antenna connected to the Ear Tip. In one embodiment of the invention, the signal may be transmitted using inductive coupling, using, for example, a coil connected to the Ear Tip.

Light Driven Hearing Aid System—a Contact Hearing System wherein signals are transmitted from the ear tip to the contact hearing device using light. In a light driven hearing system, light (e.g., laser light) may be used to transmit information, power, or both information and power to the contact hearing device.

Light Tip—an ear tip adapted for use in a light driven hearing aid system. In embodiments of the invention, a light tip may include a laser.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

REFERENCE NUMBERS

| Number | Element |
| --- | --- |
| 10 | Digital Model of end of Digital Model 20 (noise) |
| 20 | Digital Model of lateral end of subject's ear canal |
| 30 | Digital Model including medial end of subject's ear canal |
| 40 | Alignment Region |
| 50 | Medial End of Digital Model 2 |
| 60 | Starting Point of Alignment Region 40 |
| 70 | Bony Canal Region |
| 80 | Complete Digital Model |
| 100 | Gap |
| 110 | Impression Dispensing Gun |
| 120 | Mineral Oil |
| 130 | Mineral Oil Basin |
| 140 | Medial Low Viscosity Impression Material |
| 150 | Medial Low Viscosity Impression Material Dispensing Tip |
| 160 | Impression Return Box |
| 170 | Lateral High Viscosity Impression Material |
| 180 | Lateral High Viscosity Impression Material Dispensing Tip |
| 190 | Health Care Professional |
| 200 | Subject |

The invention claimed is:

1. A method of creating a hearing system for a subject, the method comprising the steps of:

taking a first impression of a first portion of an ear canal using an impression material having a first viscosity;

taking a second impression of a second portion of the ear canal using an impression material having a second viscosity;

bonding the first impression to the second impression;

raising the subject from a supine position to an upright position prior to the step of taking a second impression;

digitally scanning the first impression to create a first digital model;

digitally scanning the second impression to create a second digital model;

merging the first digital model with the second digital model to create a merged model where the lateral portion of the merged model is comprised of at least a portion of the first digital model and the medial portion of the merged model is comprised of at least a portion of the second model; and using the merged digital model to manufacture at least one of an ear tip and a contact hearing device.

2. A method according to claim 1, wherein the first impression comprises an impression of the subject's tympanic membrane.

3. A method according to claim 1, wherein the first and second portions of the ear canal overlap.

4. A method according to claim 1, wherein the first viscosity is lower than the second viscosity.

5. A method of creating a hearing system for a subject, the method comprising the steps of:

creating a hybrid impression of a subject's ear canal, the method of creating a hybrid impression comprising the steps of:

injecting a low viscosity impression material into a first portion of the ear canal, wherein the low viscosity impression material is injected with the subject in a supine position; and injecting a high viscosity impression material into a second portion of the ear canal lateral to the first portion, wherein the high viscosity impression material is injected with the subject in an upright position;

bonding the high viscosity impression material to the low viscosity impression material;

digitally scanning the hybrid impression to create a digital model of the subject's ear canal; and using the digital model to manufacture at least one of ear tip and a contact hearing device.

6. A method according to claim 5, wherein the viscosity of the low viscosity impression material is lower than the viscosity of the high viscosity impression material.

7. A method according to claim 5, further including the step of raising the subject from a supine position to an upright position prior to injecting the high viscosity impression material.

8. A method according to claim 7, wherein the subject is raised from a supine to an upright position after the low viscosity impression material has transitioned from a liquid to a gel state.

9. A method according to claim 8, wherein the subject is raised from a supine to an upright position before the low viscosity impression material is fully cured.

10. A method according to claim 6, wherein the step of raising the subject from a supine position to an upright position occurs at a predetermined time after the beginning of the step of injecting a low viscosity impression material.

11. A method according to claim 6, wherein the step of raising the subject from a supine position to an upright position occurs before the low viscosity impression material cures into a gel state.

12. A method according to claim 8, wherein the step of raising the subject from a supine position to an upright position occurs after the viscosity of the low viscosity impression material has increased to a viscosity where the low viscosity impression material no longer flows when subjected to gravitational forces.

\* \* \* \* \*